United States Patent
Nair et al.

(10) Patent No.: US 9,228,144 B2
(45) Date of Patent: Jan. 5, 2016

(54) BIOFUEL COMPOSITION, PROCESS OF PREPARATION AND A METHOD OF FUELING THEREOF

(75) Inventors: Chandrasekhar Bhaskaran Nair, Karnataka (IN); Pillarisetti Venkata Subbarao, Karnataka (IN); Phani Kumar Pullela, Karnataka (IN); Gopalakrishna Mangalore Kini, Karnataka (IN)

(73) Assignee: BIGTEC PRIVATE LIMITED, Bangalore, Karnataka (IN)

( * ) Notice: Subject to any disclaimer, the term of this patent is extended or adjusted under 35 U.S.C. 154(b) by 413 days.

(21) Appl. No.: 13/122,962

(22) PCT Filed: Aug. 10, 2009

(86) PCT No.: PCT/IN2009/000445
§ 371 (c)(1),
(2), (4) Date: Apr. 6, 2011

(87) PCT Pub. No.: WO2010/041266
PCT Pub. Date: Apr. 15, 2010

(65) Prior Publication Data
US 2011/0197498 A1 Aug. 18, 2011

(30) Foreign Application Priority Data
Oct. 6, 2008 (IN) .............. 2450/CHE/2008

(51) Int. Cl.
C10L 1/182 (2006.01)
C10L 1/02 (2006.01)
C10L 1/18 (2006.01)
C10L 1/19 (2006.01)

(52) U.S. Cl.
CPC ............... C10L 1/026 (2013.01); *C10L 1/1802* (2013.01); *C10L 1/1824* (2013.01); *C10L 1/19* (2013.01); *Y02E 50/13* (2013.01)

(58) Field of Classification Search
CPC ..................................................... C10L 1/182
USPC ............... 204/157.15; 44/457, 302, 418, 307
See application file for complete search history.

(56) References Cited

U.S. PATENT DOCUMENTS

| | | | |
|---|---|---|---|
| 2004/0068922 A1* | 4/2004 | Barbour et al. | 44/418 |
| 2005/0144834 A1* | 7/2005 | Jimeson et al. | 44/302 |
| 2009/0307967 A1* | 12/2009 | Gardener et al. | 44/457 |
| 2010/0089741 A1* | 4/2010 | Portnoff et al. | 204/157.15 |

FOREIGN PATENT DOCUMENTS

| | | |
|---|---|---|
| CN | 101082003 A | 12/2007 |
| CN | 101210204 A | 7/2008 |
| DE | 10141374 A1 | 3/2003 |
| WO | WO 2005/046861 A2 | 5/2005 |
| WO | WO2005046861 * | 5/2005 |

* cited by examiner

*Primary Examiner* — Rebecca M Fritchman
*Assistant Examiner* — Chantel Graham
(74) *Attorney, Agent, or Firm* — Knobbe, Martens, Olson & Bear, LLP

(57) ABSTRACT

The present invention relates to a biofuel composition comprising normal chain alcohol(s), natural oils and diesel optionally along with fuel additive(s); a process of preparation and a method of fueling said biofuel composition.

25 Claims, 5 Drawing Sheets

BIOFUEL COMPOSITION, PROCESS OF PREPARATION AND A METHOD OF FUELING THEREOF

RELATED APPLICATIONS

Figure 1:
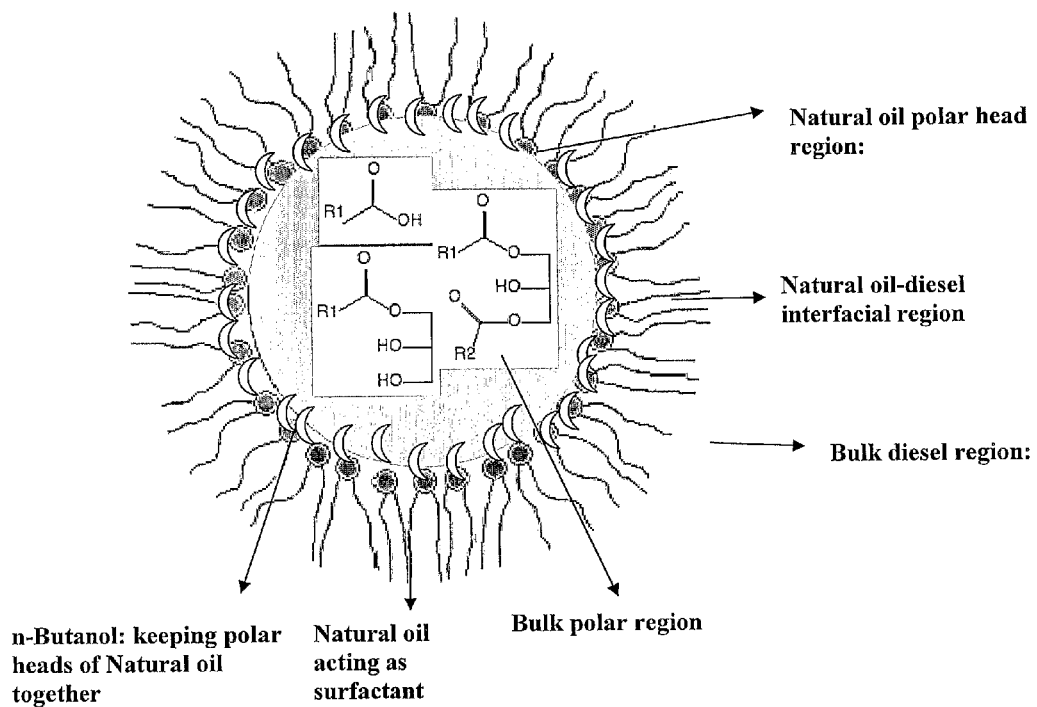

This application is a U.S. National Phase of International Application No.: PCT/IN2009/000445, filed Aug. 10, 2009, designating the U.S. and published in English on Apr. 15, 2010 as WO 2010/041266 A1, which claims the benefit of Indian Application No. 02450/CHE/2008, filed Oct. 6, 2008.

FIELD OF THE INVENTION

The present invention relates to biofuel. It involves use of normal chain alcohol(s) to stabilize blends of natural oil(s) and diesel. Therefore, the biofuel composition comprises natural oils, diesel and normal chain alcohols as its components optionally alongwith fuel additives.

BACKGROUND AND PRIOR ART

Pure plant oil (PPO) or tree based oil (TBO) or straight vegetable oil (SVO) are the terms used in the context of neat biodiesel. SVO or TBO or PPO are natural oils which rarely is used as such in commercial diesel engines and their use as blends is also limited.

Natural oils also include any oil obtained from animal source as well (animal fat oil). Plant oils such as SVO or PPO or TBO and animal oils are rich in triglycerides and can be obtained by mechanical, chemical & physical processing from the respective sources.

Natural oils as blends of diesel have some properties that prevent their use in commercial diesel engines. The major ones are listed below.

1. High boiling point: Natural oils boil at higher temperature than diesel and have problems meeting the norms required for minimum distillation characteristics. This causes the residue formation in engine and in long run there will be accumulation of greasy material in the engine. This could lead to clogging, increased smoke at higher loads, increase in emission of nitrogen oxides (NOx), loss of power and mileage, sudden stoppage of engine.
2. High viscosity: Natural oils are about eight times viscous than diesel and as such cannot be used in current diesel engines without modification. Natural oil blends of diesel (below 20%) often meet the physico chemical properties of diesel and were used without any short-term issues. But in long term, they cause non-uniform spraying at ignition chamber, engine deposits, inefficient burning of fuel and increase in NOx.
3. Immiscibility: Natural oils are miscible with diesel and stay miscible for 15-30 days depending on the composition of oil, but longer periods of storage cause separation of natural oils and diesel layers and in about two months storage, almost complete separation occurs. The separated layer looks like a brown or yellow precipitate and this causes engine deposits, sudden stoppage/malfunction of engine, increase in emission of particulate matter, etc.

The main issues with respect to diesel engine by use of blends of natural oils with diesel are

| Issues | Reason | Possible solution |
|---|---|---|
| a) Clogging | Deposits and greasy material forming in engine | Grease or engine deposit formation need to be prevented (transesterification of natural oil is one method) |
| b) Increase in smoke | Improper mixing of natural oils and diesel, gradual separation of layers | Miscibility with diesel need to be improved (by adding some additives) |
| c) Increase in NOx | Any strain on fuel delivery/burning causes increase in NOx. Strain in fuel delivery is mainly caused by non-uniformity of fuel. | Fuel injected need to be uniform in composition and quality |
| d) Loss of power and mileage | Even though natural oils have rich oxygen content and higher calorific value than diesel, loss of power and mileage occur due to non-uniformity of fuel. | Separation of natural oils and diesel layers is the main cause and natural oils needs to be made completely miscible with diesel |
| e) Sudden stoppage of engine | Increase in moisture content in engine due to the waxy solid deposition attracts dust and more moisture that are retained inside the engine. Eventually, these enter the ignition chamber causing abrupt change in fuel behavior causing sudden stoppage of engine. | The waxy or grease solid formation need to be avoided and any free fatty acids or partially hydrolysed triglycerides present in natural oils need to be solubilized in diesel. |
| f) Engine deposits | Separation of natural oils and diesel and their in turn assistance in accumulation of dust and moisture is responsible for engine deposits. | Natural oils (SVO) are highly viscous liquids with minute percentage of free fatty acids or partially hydrolysed triglycerides (diglycerides, monoglycerides) produced during mechanical or solvent based processing of seeds/bark/leaves. These free fatty acids precipitate from blended diesel within one day and increase the engine deposit formation and somehow these fatty acids need to be solubilized in diesel. |

| Issues | Reason | Possible solution |
| --- | --- | --- |
| g) Increase in sound from engine | Engine deposits and non uniformity of fuel flow results in stress on compression ignition system, which results in increased noise | Elimination of any insoluble particle in blended diesel and ensuring uniform flow of fuel. |

It is clearly understood from above table that most of the problems caused by natural oil blends with diesel is immiscibility. When the natural oil has the property of not being soluble in diesel, the above problems like engine deposits, increase in NOx emission, increased smoke, decrease in power and mileage, etc occur.

To address the problems associated with use of natural oil in diesel, biodiesel manufacturers use transesterified oil obtained through transesterification reaction. This way the triglycerides are converted to free fatty acids and the fatty acids are in turn esterified with methanol or ethanol (use of higher alcohols is also reported). The hydrolysis process involves use of sodium hydroxide and methanol and is a heat intensive process (lot of heat from environment to be supplied). There is increasing criticism that whatever benefit derived by shifting to renewable plant based oils (reduction in carbon dioxide, lower pollution, etc), is being lost by use of toxic industrial chemicals (like methanol), problems with waste disposal, increased heat input etc.

Hence, there is a need for development of methods to avoid transesterification of natural oils. A process to convert the natural oils to a diesel blend product is credible, but identifying compounds or components which can stabilize natural oil blends will be of great interest and could provide a cheaper, safer and environmentally friendly alternative to transesterification, help in reduction of pollution, carbon dioxide emissions, decrease in byproduct toxicity, no heat input from environment, etc.

PCT/US99/00598 discloses an additive composition consisting of water soluble alcohols. All the composition disclosed in PCT/US99/00598 shows the presence of water and ethanol.

Yoshimoto et al (Published by society of automotive engineers, 400 commonwealth drive, Warrendale, Pa.-15096, USA, October 2002) discloses performance of a diesel engine by the blends of rapeseed oil and oxygenated organic compounds such as ethanol, 1-propanol, 1-butanol, 1-pentanol, 2-methoxyethanol, 2-ethoxyethanol, 2-butoxyethanol and dibutyl ether.

Khaled et al (1$^{st}$ International energy conversion engineering conference, Virginia, USA, August 2003) discloses fuel blends in compression ignition engines which fuel blend comprises iso-butanol, diesel and olive oil.

The present invention addresses the problems associated with prior art mentioned above.

OBJECTS OF THE INVENTION

The main object of the present invention is to obtain a biofuel composition comprising normal chain alcohol(s), natural oils and diesel.

Another object of the present invention is to develop a process for obtaining the biofuel composition. biofuel composition.

STATEMENT OF THE INVENTION

Accordingly, the present invention relates to a biofuel composition comprising normal chain alcohol(s) having greater than 3 carbon atoms but not more than 21 carbon atoms at a concentration ranging from about 1% to about 24% v/v, natural oils at a concentration ranging from about 1% to about 24% v/v and diesel at a concentration ranging from about 52% to about 98% v/v optionally alongwith fuel additive(s); a biofuel composition comprising n-butanol at a concentration ranging from about 1% to about 24% v/v, natural oils at a concentration ranging from about 1% to about 24% v/v and diesel at a concentration ranging from about 52% to about 98% v/v optionally alongwith fuel additive(s); a process for preparation of biofuel composition comprising normal chain alcohol(s) having greater than 3 carbon atoms but not more than 21 carbon atoms at a concentration ranging from about 1% to about 24% v/v, natural oils at a concentration ranging from about 1% to about 24% v/v and diesel at a concentration ranging from about 52% to about 98% v/v optionally alongwith fuel additive(s), said process comprises mixing said normal chain alcohol(s) with a blend comprising the natural oils and the diesel optionally alongwith fuel additive(s); and a method of fueling biofuel composition comprising normal chain alcohol(s) having greater than 3 carbon atoms but not more than 21 carbon atoms at a concentration ranging from about 1% to about 24% v/v, natural oils at a concentration ranging from about 1% to about 24% v/v and diesel at a concentration ranging from about 52% to about 98% v/v optionally alongwith fuel additive(s), said method comprising fueling the biofuel composition for fueling applications.

BRIEF DESCRIPTION OF ACCOMPANYING FIGURES

FIG. 1 Reverse micelle structure in natural oil blended diesel in presence of normal chain alcohols. Reverse micelle in diesel shows bulk diesel region, natural oil-diesel interfacial region, natural oil polar head region and bulk polar region. Natural oil polar head region: This region has n-butanol in combination with triglyceride polar groups. n-butanol helps the polar heads to form stable reverse micelles by increasing polarity of system; Natural oil-diesel interfacial region: This is formed by addition of n-butanol (n-butanol, natural oil and diesel); Bulk diesel region: Almost diesel characteristics, very non polar; Bulk polar region: Polar components like free fatty acids, monoglycerides and diglycerides produced from degradation of natural oil could be present. This region could also hold traces of water absorbed by the polar components over time, preventing engine deposit formation.

Figure 2:
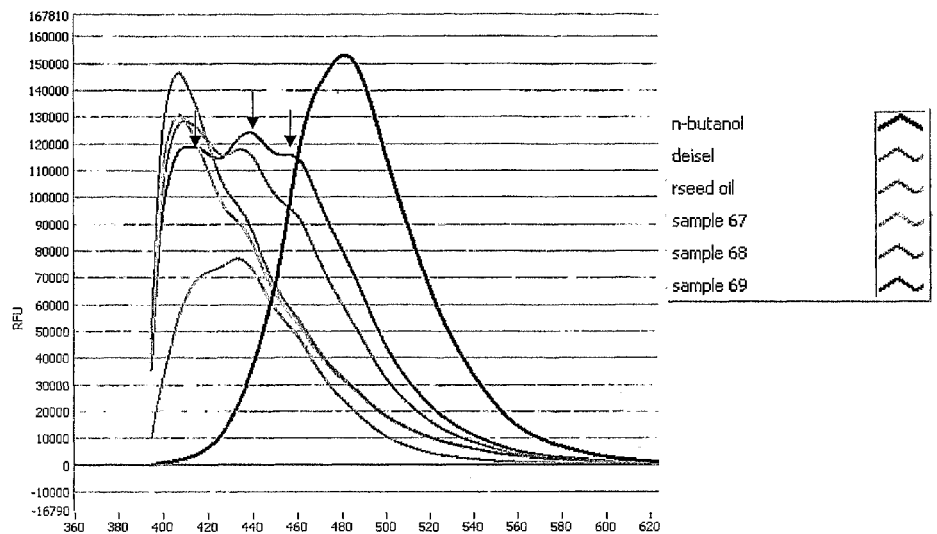

FIG. 2 shows the existence of reverse micelle in fuel blends containing rapeseed oil, n-butanol and diesel. The samples are n-butanol, diesel, rapeseed oil (SVO), Sample 67 (5% rapeseed oil, 5% n-butanol, 90% diesel), Sample 68 (10% rapeseed oil, 10% n-butanol, 80% diesel), Sample 69 (20% rapeseed oil, 20% n-butanol, 60% diesel). Samples 67, 68 and 69 show 3 peaks corresponding to 3 regions in reverse micelles (bulk diesel region, SVO-diesel interfacial region and SVO polar head region).

Figure 3:
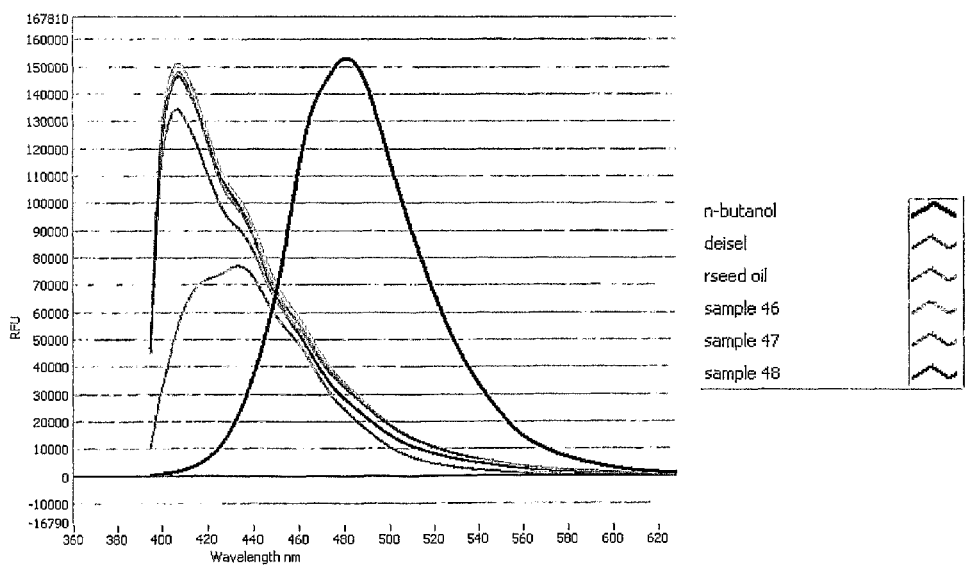

FIG. 3 shows the absence of reverse micelle in fuel blends containing natural oil and diesel. The samples are n-butanol, diesel, rapeseed oil (rseed oil, SVO), Sample 46 (10% rapeseed oil, 90% diesel), Sample 47 (20% rapeseed oil, 80% diesel), Sample 48 (40% rapeseed oil, 60% diesel). It can be clearly observed that, without n-butanol, the samples have behavior similar to diesel and after standing for few days, due to absence of stable interactions of polar heads of rapeseed oil with diesel, the rapeseed oil separates from diesel.

Figure 4:
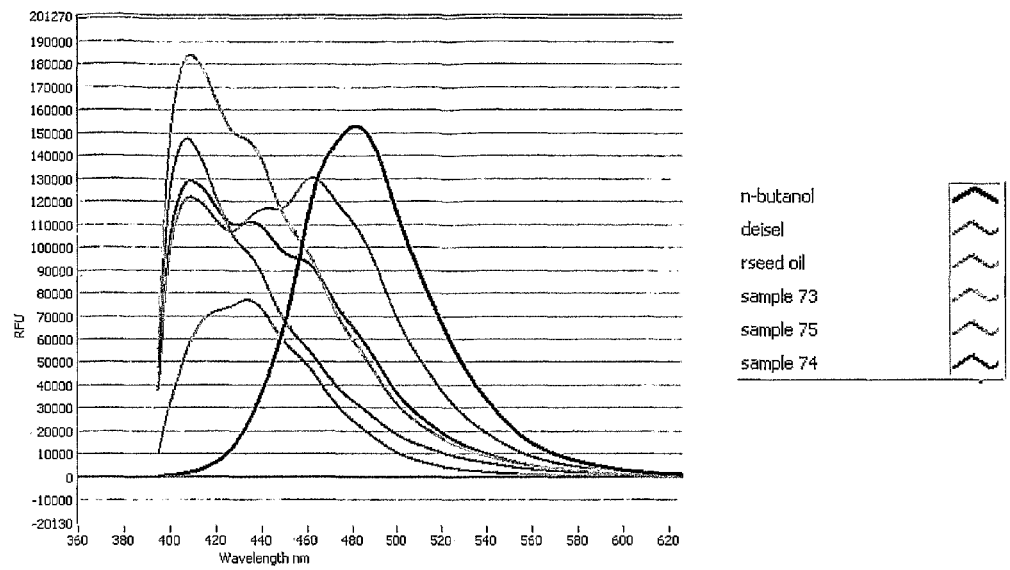

FIG. 4 shows that n-butanol has the property of formation of reverse micelle in diesel and existence of three different regions. This is n-butanol control for all the oils in the study. The samples are n-butanol, diesel, rapeseed oil (rseed oil, SVO), Sample 73 (10% n-butanol, 90% diesel), Sample 74 (20% n-butanol, 80% diesel), Sample 75 (40% n-butanol, 60% diesel). n-butanol blends in diesel also show three regions similar to natural oil and n-butanol blends with diesel. This indicates that the reverse micellar structure is originating from presence of n-butanol and it is aiding natural oil to form similar structures in diesel.

Figure 5:
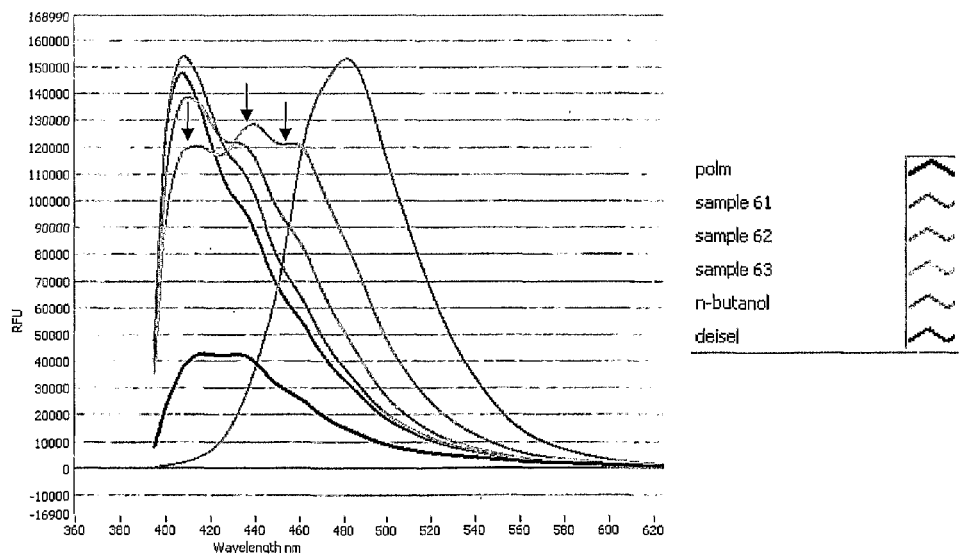

FIG. 5 shows the existence of reverse micelle in fuel blends containing palmoline oil, n-butanol and diesel. The samples are n-butanol, diesel, palmoline oil (polm, SVO), Sample 61 (5% palmoline oil, 5% n-butanol, 90% diesel), Sample 62 (10% palmoline oil, 10% n-butanol, 80% diesel), Sample 63 (20% palmoline oil, 20% n-butanol, 60% diesel). N-butanol blends in diesel show three regions similar to natural oil and n-butanol blends with diesel. This indicates that the reverse micellar structure is originating from presence of n-butanol and it is aiding natural oil to form similar structures in diesel. Samples 61, 62 and 63 shows 3 peaks corresponding to 3 regions in reverse micelles (bulk diesel region, SVO-diesel interfacial region and SVO polar head region).

Figure 6:
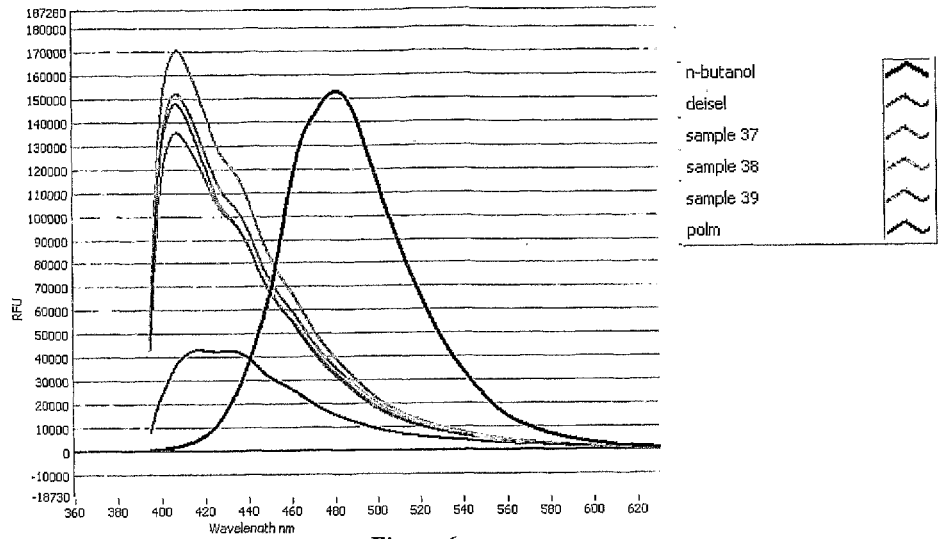

FIG. 6 shows the absence of reverse micelle in fuel blends containing SVO and diesel. The samples are n-butanol, diesel, palmoline oil (polm, SVO), Sample 37 (10% palmoline oil, 90% diesel), Sample 38 (20% palmoline oil, 80% diesel), Sample 39 (40% palmoline oil, 60% diesel). It can be clearly observed that, without n-butanol, the samples have behavior similar to diesel and after standing for few days, due to absence of stable interactions of polar heads of SVO with diesel, the SVO separates from diesel.

Figure 7:
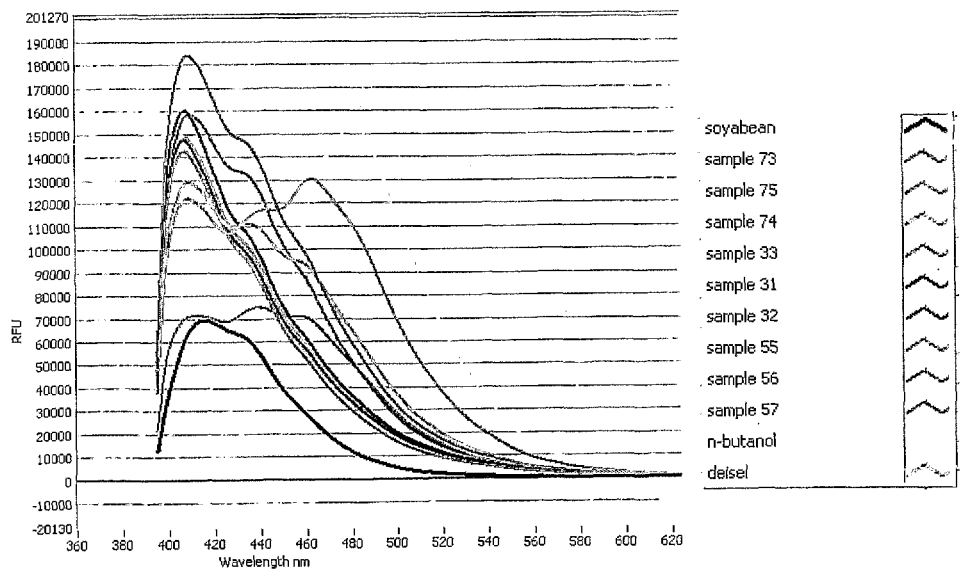

FIG. 7 shows the study on soyabean oil (SVO) using PRODAN. The samples are n-butanol, diesel, soyabean oil (SVO), Sample 55 (5% soyabean oil, 5% n-butanol, 90% diesel), Sample 56 (10% soyabean oil, 10% n-butanol, 80% diesel), Sample 57 (20% soyabean oil, 20% n-butanol, 60% diesel), Sample 74 (20% n-butanol, 80% diesel), Sample 73 (10% n-butanol, 90% diesel), Sample 75 (40% n-butanol, 60% diesel), Sample 31 (10% soyabean oil, 90% diesel), Sample 32 (20% soyabean oil, 90% diesel), Sample 33 (40% soyabean oil, 60% diesel)

Figure 8:
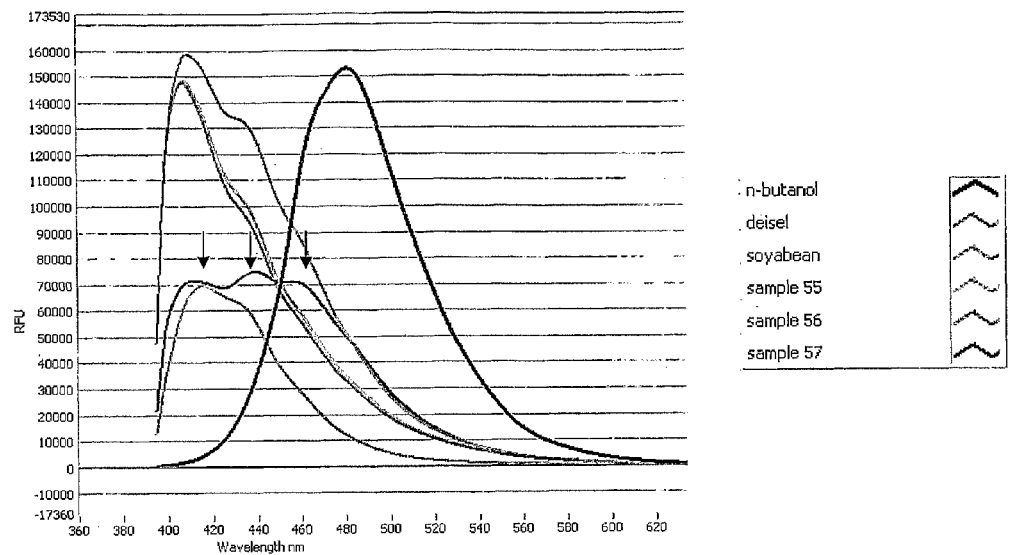

FIG. 8 shows the existence of reverse micelle in fuel blends containing soyabean oil, n-butanol and diesel. The samples are n-butanol, diesel, soyabean oil (SVO), Sample 55 (5% soyabean oil, 5% n-butanol, 90% diesel), Sample 56 (10% soyabean oil, 10% n-butanol, 80% diesel), Sample 57 (20% soyabean oil, 20% n-butanol, 60% diesel). Samples 55, 56 and 57 shows 3 peaks corresponding to 3 regions in reverse micelles (bulk diesel region, SVO-diesel interfacial region, and SVO polar head region).

Figure 9:
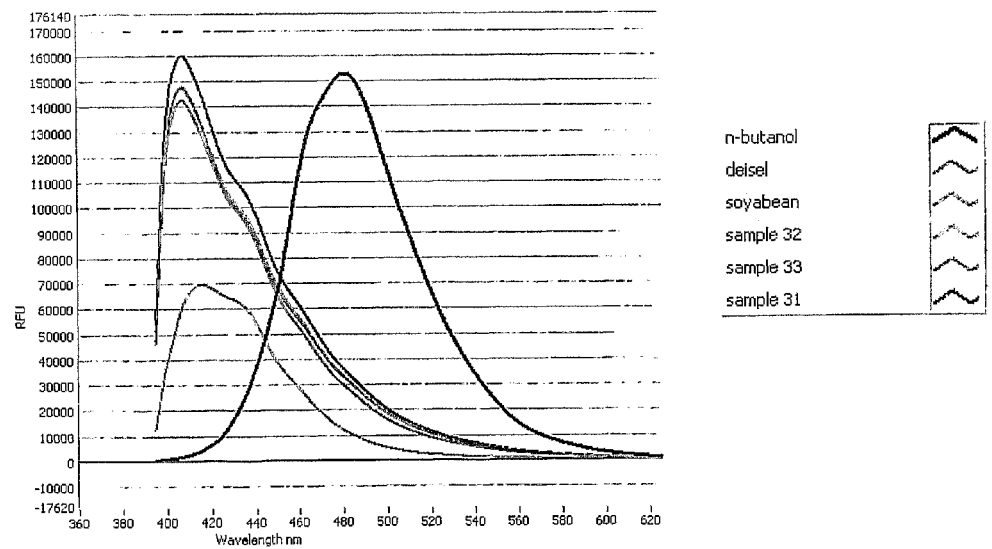

FIG. 9 shows the absence of reverse micelle in fuel blends containing soyabean oil and diesel. The samples are n-butanol, diesel, soyabean oil (SVO), Sample 31 (10% soyabean oil, 90% diesel), Sample 32 (20% soyabean oil, 80% diesel), Sample 33 (40% soyabean oil, 60% diesel). It can be clearly observed that, without n-butanol, the samples have behavior similar to diesel and after standing for few days, due to absence of stable interactions of polar heads of soyabean oil with diesel, the soyabean oil separates from diesel.

DETAILED DESCRIPTION OF THE INVENTION

The present invention relates to a biofuel composition comprising normal chain alcohol(s) having greater than 3 carbon atoms but not more than 21 carbon atoms at a concentration ranging from about 1% to about 24% v/v, natural oils at a concentration ranging from about 1% to about 24% v/v and diesel at a concentration ranging from about 52% to about 98% v/v optionally alongwith fuel additive(s).

In another embodiment of the present invention, the normal chain alcohols are selected from a group comprising n-butanol, n-pentanol, n-hexanol, n-heptanol, n-octanol (capryl alcohol), n-nonanol (pelargonic alcohol), n-decanol (capric alcohol), n-dodecanol (lauryl alcohol), n-pentadecanol, n-hexadecanol (cetyl alcohol), n-tetradecanol (myristyl alcohol), cis-9-hexadecen-1-ol (palmitoleyl alcohol), n-octadecanol (stearyl alcohol), 9E-octadecen-1-ol (elaidyl alcohol), cis-9-octadecen-1-ol (oleyl alcohol), 9Z, 12Z-octadecadien-1-ol (linoleyl alcohol), 9E, 12E-octadecadien-1-ol (elaidolinoleyl alcohol), 9Z, 12Z, 15Z-octadecatrien-1-ol (linolenyl alcohol), 9E, 12E, 15-E-octadecatrien-1-ol (elaidolinolenyl alcohol), 12-hydroxy-9-octadecen-1-ol (ricinoleyl alcohol) and 1-eicosanol (arachidyl alcohol) or any combinations thereof.

In yet another embodiment of the present invention, the normal chain alcohol is preferably n-butanol.

In still another embodiment of the present invention, the natural oils are selected from a group comprising straight vegetable oil (SVO), plant parts oils (PPO), tree based oil (TBO), animal fat oil or any combinations thereof.

In still another embodiment of the present invention, the ratio of normal chain alcohol(s) and natural oils is preferably 1:1.

In still another embodiment of the present invention, the fuel additive(s) is selected from a group comprising anti-polymerizing agents, anti-knocking agents anti-freezing agents, anti-coagulation agents, anti-precipitation agents, cetane index boosters and cetane number boosters or any combinations thereof.

In still another embodiment of the present invention, the fuel additive(s) is present at a concentration ranging from about 0.01 to about 5% v/v, preferably about 0.01% to about 1% v/v.

In still another embodiment of the present invention, the biofuel composition comprises normal chain alcohol(s) having greater than 3 carbon atoms but not more than 21 carbon atoms at a concentration of about 5% v/v, natural oils at a concentration of about 5% v/v and diesel at a concentration of about 90% v/v optionally alongwith fuel additive(s).

In still another embodiment of the present invention, the biofuel composition comprises normal chain alcohol(s) having greater than 3 carbon atoms but not more than 21 carbon atoms at a concentration of about 7.5% v/v, natural oils at a concentration of about 7.5% v/v and diesel at a concentration of about 85% v/v optionally alongwith fuel additive(s).

In still another embodiment of the present invention, the biofuel composition comprises normal chain alcohol(s) having greater than 3 carbon atoms but not more than 21 carbon atoms at a concentration of about 10% v/v, natural oils at a concentration of about 10% v/v and diesel at a concentration of about 80% v/v optionally alongwith fuel additive(s).

In still another embodiment of the present invention, the biofuel composition comprises normal chain alcohol(s) having greater than 3 carbon atoms but not more than 21 carbon atoms at a concentration of about 20% v/v, natural oils at a concentration of about 20% v/v and diesel at a concentration of about 60% v/v optionally alongwith fuel additive(s).

In still another embodiment of the present invention, the biofuel composition comprises normal chain alcohol(s) having greater than 3 carbon atoms but not more than 21 carbon atoms at a concentration of about 10% v/v, natural oils at a concentration of about 5% v/v and diesel at a concentration of about 85% v/v optionally alongwith fuel additive(s).

The present invention relates to a biofuel composition comprising n-butanol at a concentration ranging from about 1% to about 24% v/v, natural oils at a concentration ranging from about 1% to about 24% v/v and diesel at a concentration ranging from about 52% to about 98% v/v optionally alongwith fuel additive(s).

The present invention relates to a process for preparation of biofuel composition comprising normal chain alcohol(s) having greater than 3 carbon atoms but not more than 21 carbon atoms at a concentration ranging from about 1% to about 24% v/v, natural oils at a concentration ranging from about 1% to about 24% v/v and diesel at a concentration ranging from about 52% to about 98% v/v optionally alongwith fuel additive(s), said process comprises mixing said normal chain alcohol(s) with a blend comprising the natural oils and the diesel optionally alongwith fuel additive(s).

In still another embodiment of the present invention, the normal chain alcohols are selected from a group comprising n-butanol, n-pentanol, n-hexanol, n-heptanol, n-octanol (capryl alcohol), n-nonanol (pelargonic alcohol), n-decanol (capric alcohol), n-dodecanol (lauryl alcohol), n-pentadecanol, n-hexadecanol (cetyl alcohol), n-tetradecanol (myristyl alcohol), cis-9-hexadecen-1-ol (palmitoleyl alcohol), n-octadecanol (stearyl alcohol), 9E-octadecen-1-ol (elaidyl alcohol), cis-9-octadecen-1-ol (oleyl alcohol), 9Z, 12Z-octadecadien-1-ol (linoleyl alcohol), 9E, 12E-octadecadien-1-ol (elaidolinoleyl alcohol), 9Z, 12Z, 15Z-octadecatrien-1-ol (linolenyl alcohol), 9E, 12E, 15-E-octadecatrien-1-ol (elaidolinolenyl alcohol), 12-hydroxy-9-octadecen-1-ol (ricinoleyl alcohol) and 1-eicosanol (arachidyl alcohol) or any combinations thereof.

In still another embodiment of the present invention, the natural oils are selected from a group comprising straight vegetable oil (SVO), plant parts oils (PPO), tree based oil (TBO), animal fat oil or any combinations thereof.

In still another embodiment of the present invention, the natural oils are obtained by mechanical or chemical treatment of the source from which it is derived.

In still another embodiment of the present invention, the ratio of normal chain alcohol(s) and natural oils is preferably 1:1.

In still another embodiment of the present invention, the fuel additive(s) is selected from a group comprising anti-polymerizing agents, anti-knocking agents anti-freezing agents, anti-coagulation agents, anti-precipitation agents, cetane index boosters and cetane number boosters or any combinations thereof.

In still another embodiment of the present invention, the fuel additive(s) is present at a concentration ranging from about 0.01 to about 5% v/v, preferably about 0.01% to about 1% v/v.

In still another embodiment of the present invention, the process provides for biofuel composition comprising normal chain alcohol(s) having greater than 3 carbon atoms but not more than 21 carbon atoms at a concentration of about 5% v/v, natural oils at a concentration of about 5% v/v and diesel at a concentration of about 90% v/v optionally alongwith fuel additive(s).

In still another embodiment of the present invention, the process provides for biofuel composition comprising normal chain alcohol(s) having greater than 3 carbon atoms but not more than 21 carbon atoms at a concentration of about 7.5% v/v, natural oils at a concentration of about 7.5% v/v and diesel at a concentration of about 85% v/v optionally alongwith fuel additive(s).

In still another embodiment of the present invention, the process provides for biofuel composition comprising normal chain alcohol(s) having greater than 3 carbon atoms but not more than 21 carbon atoms at a concentration of about 10% v/v, natural oils at a concentration of about 10% v/v and diesel at a concentration of about 80% v/v optionally alongwith fuel additive(s).

In still another embodiment of the present invention, the process provides for biofuel composition comprising normal chain alcohol(s) having greater than 3 carbon atoms but not more than 21 carbon atoms at a concentration of about 20% v/v, natural oils at a concentration of about 20% v/v and diesel at a concentration of about 60% v/v optionally alongwith fuel additive(s).

In still another embodiment of the present invention, the process provides for biofuel composition comprising normal chain alcohol(s) having greater than 3 carbon atoms but not more than 21 carbon atoms at a concentration of about 10% v/v, natural oils at a concentration of about 5% v/v and diesel at a concentration of about 85% v/v optionally alongwith fuel additive(s).

In still another embodiment of the present invention, the process provides for biofuel composition comprising butanol at a concentration ranging from about 1% to about 24% v/v, natural oils at a concentration ranging from about 1% to about 24% v/v and diesel at a concentration ranging from about 52% to about 98% v/v optionally alongwith fuel additive(s).

The present invention relates to a method of fueling biofuel composition comprising normal chain alcohol(s) having greater than 3 carbon atoms but not more than 21 carbon atoms at a concentration ranging from about 1% to about 24% v/v, natural oils at a concentration ranging from about 1% to about 24% v/v and diesel at a concentration ranging from about 52% to about 98% v/v optionally alongwith fuel additive(s), said method comprising fueling the biofuel composition for fueling applications.

In still another embodiment of the present invention, the fueling applications are selected from a group comprising space heating, lighting, cooking, running of engines in automobiles, running of motor pumps and generators.

The present invention relates to use of normal-chain alcohols (the alcohol group —OH attached to the terminal carbon) having greater than 3 carbon atoms upto 21 carbon atoms to stabilize natural oil blends in diesel to obtain a biofuel composition. The normal chain alcohols include n-butanol, n-pentanol, n-hexanol, n-heptanol, n-octanol (capryl alcohol), n-nonanol (pelargonic alcohol), n-decanol (capric alcohol), n-dodecanol (lauryl alcohol), n-pentadecanol, n-hexadecanol (cetyl alcohol), n-tetradecanol (myristyl alcohol), cis-9-hexadecen-1-ol (palmitoleyl alcohol), n-octadecanol (stearyl alcohol), 9E-octadecen-1-ol (elaidyl alcohol), cis-9-octadecen-1-ol (oleyl alcohol), 9Z, 12Z-octadecadien-1-ol (linoleyl alcohol), 9E, 12E-octadecadien-1-ol (elaidolinoleyl alcohol), 9Z, 12Z, 15Z-octadecatrien-1-ol (linolenyl alcohol), 9E, 12E, 15-E-octadecatrien-1-ol (elaidolinolenyl alcohol), 12-hydroxy-9-octadecen-1-ol (ricinoleyl alcohol) and 1-eicosanol (arachidyl alcohol) preferably n-butanol or combinations thereof. Normal chain alcohols may be saturated or unsaturated.

The biofuel composition comprises normal chain alcohol(s) having greater than 3 carbon atoms upto 21 carbon atoms ranging from about 1% to about 24%, natural oils ranging from about 1% to about 24% and diesel at a concentration ranging from about 52% to about 98% optionally along with fuel additives. The natural oil used in the present invention may be either crude or refined. The fuel additives are those which are normally added to any diesel fuel composition.

n-butanol can be produced by microbial fermentation, chemically synthesized or obtained from a plant source by bacterial action. This includes obtaining butanol from cellulose containing plants, lignin-containing plants, from sewage and animal waste, from sugars obtained from plant source and then by fermentation involving algae. Higher alcohols can also be obtained in similar manner and used in the composition. n-butanol is a smallest carbon containing alcohol which can be used for this purpose.

n-dodecanol (lauryl alcohol), n-pentadecanol, n-hexadecanol (cetyl alcohol), n-tetradecanol (myristyl alcohol), cis-9-hexadecen-1-ol (palmitoleyl alcohol), n-octadecanol (stearyl alcohol), 9E-octadecen-1-ol (elaidyl alcohol), cis-9-octadecen-1-ol (oleyl alcohol), 9Z, 12Z-octadecadien-1-ol (linoleyl alcohol), 9E, 12E-octadecadien-1-ol (elaidolinoleyl alcohol), 9Z, 12Z, 15Z-octadecatrien-1-ol (linolenyl alcohol), 9E, 12E, 15-E-octadecatrien-1-ol (elaidolinolenyl alcohol), 12-hydroxy-9-octadecen-1-ol (ricinoleyl alcohol), 1-eicosanol (arachidyl alcohol) can be produced from chemical derivatization of triglycerides. n-octanol (capryl alcohol), n-nonanol (pelargonic alcohol), n-decanol (capric alcohol) can also be produced from plant sources.

Natural oils include straight vegetable oil (SVO), Pure plant oil (PPO), tree based oil (TBO), animal fat oil etc. These are rich in triglycerides and can be obtained by mechanical, chemical & physical processing.

Straight vegetable oil (SVO) is defined as oil obtained from any plant part like, leaves, seeds, bark, flowers, etc. PPO is considered to be equivalent of SVO and includes any oil obtained from a plant source or plant part, including oils obtained from algae.

SVO or PPO can be obtained by mechanical pressing of plant part (eg: crushing and pressing of neem seeds), mechanical processing of plant part (eg: processing of Jatropa seeds to obtain oil), solvent extraction of plant oil (eg: neem seed oil (SVO) obtained by hexane extraction), crushing of leaves (eg: eucalyptus oil), extraction or crushing of wood (eg: cedarwood oil), processing of lipid containing microorganisms (eg: oil from algae) etc.

SVO or PPO obtained from any plant source (edible or non edible) can be used in the biofuel composition of the present invention. SVO or PPO can be obtained from any edible or non-edible part of a plant source including seeds of Jatropa, Pongamia, neem, sunflower, rapeseed, eucalyptus leaves, cedarwood, rose wood, etc.

Minimal chemical processing is defined as the processing involving acids, bases, and alcohols and physical processing involves crushing, pressing, grinding, squeezing etc where mechanical energy is used to obtain the oil.

In general, SVO and PPO are also tree-based oil (TBO) and it should be noted that TBO could be used as part of this invention. In this document, it should be noted that TBO, SVO and PPO are used inter changeably but all of them mean that it is an oil produced from a natural source and is mechanically or chemically treated. Chemical treatment means using an industrial chemical to extract the oil in a chemically modified form. Thus, waste or used natural oils are also used in the composition of present invention.

Chemical treatments include extraction with an organic solvent, water, or distillation or any aqueous based azeotropic distillation.

In this document, the use of words "precipitate" and "no precipitate" with respect to some examples and their definitions are given below.

No precipitate: No visible turbidity, precipitate, separation of layers, settling of greasy material, settling of viscous liquid, droplet formation on the walls or any other evidence of non-uniformity in the liquid.

Precipitate: Observation of turbidity, precipitate, separation of layers, settling of greasy material, two different layers, settling of viscous liquid, droplet formation on the walls or observation of non-uniformity in solution.

In the composition of present invention, any alcohol having greater than 3 carbon upto 21 carbon stabilize blends of natural oil and diesel.

Mechanism of stabilization of natural oil in diesel by normal chain alcohols is by one of the following methods:

a) Increase solubility of natural oil in diesel
   Alcohols containing greater than 3 carbons are usually chemical compounds soluble in diesel and natural oil. Being soluble in both (diesel and natural oil), allows them to increase solubility of natural oil in diesel. Due to their higher boiling points (>100° C.), their composition in diesel stays same under normal storage conditions. This allows the composition to remain more or less same for longer storage periods, which results in stable blends with longer shelf life.

b) Formation of non ionic-reverse micelles kind of structure in diesel
   When surfactants assemble in oil, the aggregate is referred to as a reverse micelle. In a reverse micelle, the heads are in the core and the tails maintain favorable contact with diesel. Surfactants are also often classified into four primary groups; anionic, cationic, non-ionic and zwitterionic (dual charge).

The above discussed normal chain alcohols tend to aid natural oil to act as surfactants. When natural oil act as surfactants, the non polar tails maintain a favorable interaction with diesel and the polar functional groups form a core which helps in solubilizing any by products formed during the storage of natural oil. Natural oils are known to give out free fatty acids, monoglycerides and diglycerides on storage (in small percentage), which are highly insoluble in diesel and form a greasy material. This is one of the reasons why natural oils are not used as blends of diesel. When fuel additives like n-butanol are used, they tend to increase the solubility of natural oil in diesel and help them act as surfactants which can form reverse micelles. Reverse micelle formation is characterized by observing different fluorescence signals for charge transfer fluorescent probes. The widely used charge transfer fluorescent probe to characterize reverse micelles is PRODAN. Formation of reverse micelle in diesel results in 4 regions namely (FIG. 1):

Bulk diesel region: This region is formed when the diesel is excess of natural oil. This region is characterized by emission in charge transfer fluorescent probes with lower fluorescent emissions.

Natural oil-diesel interfacial region: In this region, Natural oil and diesel are at interface and have fluorescent spectra of charge transfer probes red shifted compared to bulk diesel region.

Natural oil polar head region: Natural oil in diesel form a core of polar functional groups, which can be characterized by further red shift in charge transfer probe's emission spectrum. This is a very polar region and usually the red shift is significant. Importantly, this is the region which will stabilize the formed polar by products of Natural oil and provide long-term stability for Natural oil in diesel.

Bulk polar region: Difficult to observe in current system, as components vary overtime. Mostly polar components like free fatty acids, monoglycerides and diglycerides produced from degradation of Natural oil may be present. This region can hold traces of water absorbed by these polar components. In reverse micelles, this region can be characterized as bulk water region, but the polar impurities possible in natural oil-diesel blends are not that polar and hence, the fluorescent peak corresponding to this region could overlap with the natural oil polar head region.

It is observed that a 20% mixture of n-butanol and 20% of natural oils can stay solubilized in diesel for days together indicating that when natural oil is blended with diesel, the by products formed during storage like free fatty acids, monoglycerides, traces of glycerol and diglycerides will be soluble in diesel.

Use of Fluorescent Probes to Detect Reverse Micelle Regions:

A solution is recognized by uniform distribution of solutes in a solvent. Reverse micelles have a unique structure, in which using a charge transfer probe, at least three different regions can be identified.

In natural oil/normal chain alcohols/diesel reverse micelle system, the possible regions are bulk diesel region, natural oil-diesel interfacial region, natural oil polar head region and bulk polar region. The surfactant behavior may not be solely from normal chain alcohols or natural oil, but because of combination of both these components. Importantly, the key three regions were identified when a charge transfer fluorescent probe is used.

Charge transfer fluorescent probes like PRODAN exist in two different forms depending on whether it is in polar or non-polar medium. Depending on the polarity of the medium and the ratio of charge transfer, species exist in solution.

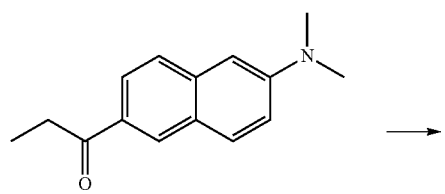

PRODAN non-polar form

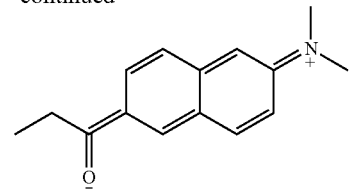

PRODAN polar form

The existence of reverse micelle in fuel blends containing natural oil, normal chain alcohols and diesel of the present invention is shown in FIGS. 2, 5 and 7 with specific examples. From the FIGS. 3, 6 and 9 it is clear that, without normal chain alcohols, the samples have behavior similar to diesel and after standing for few days, due to absence of stable interactions of polar heads of natural oils with diesel, the natural oil separates from diesel. Normal chain alcohol blends in diesel (FIG. 4) also show three regions similar to natural oil and n-butanol blends with diesel. This indicates that the reverse micellar structure is originating from presence of n-butanol and it is aiding natural oil to form similar structures in diesel.

Establishing n-Butanol for Stabilizing Neem Seed Oil Blends with Diesel

Sample details are

| | Percentage of diesel | Percentage of Neem seed oil | Percentage of n-butanol | Percentage of t-butanol |
|---|---|---|---|---|
| Sample 1 | 100 | — | — | — |
| Sample 2 | — | 100 | — | — |
| Sample 3 | — | — | 100 | — |
| Sample 4 | — | — | — | 100 |
| Sample 6 | 95 | 5 | — | — |
| Sample 7 | 90 | 10 | — | — |
| Sample 8 | 90 | 5 | 5 | — |
| Sample 9 | 85 | 10 | 5 | — |
| Sample 10 | 90 | 5 | — | 5 |
| Sample 11 | 85 | 10 | — | 5 |

Results of the experiment are

| | 0 Days | 1 Days | 7 Days | 14 Days | 30 Days | 90 Days |
|---|---|---|---|---|---|---|
| Sample 1 | No precipitate | No precipitate | No precipitate | No precipitate | No precipitate | No precipitate |
| Sample 2 | No precipitate | No precipitate | No precipitate | No precipitate | No precipitate | No precipitate |
| Sample 3 | No precipitate | No precipitate | No precipitate | No precipitate | No precipitate | No precipitate |
| Sample 4 | No precipitate | No precipitate | No precipitate | No precipitate | No precipitate | No precipitate |
| Sample 6 | No precipitate | Precipitate | Precipitate | Precipitate | Precipitate | Precipitate |
| Sample 7 | Precipitate | Precipitate | Precipitate | Precipitate | Precipitate | Precipitate |
| Sample 8 | No precipitate | No precipitate | No precipitate | No precipitate | No precipitate | No precipitate |
| Sample 9 | No precipitate | No precipitate | No precipitate | No precipitate | No precipitate | No precipitate |
| Sample 10 (t-butanol) | No precipitate | No precipitate | No precipitate | Precipitate | Precipitate | Precipitate |
| Sample 11 (t-butanol) | No precipitate | No precipitate | Precipitate | Precipitate | Precipitate | Precipitate |

The above experiment clearly concludes that n-butanol can be used for stabilizing neem seed oil (SVO) blends with diesel. Though t-butanol has the same number of carbons as n-butanol, it fails to stabilize neem seed oil (SVO) blend with diesel for more than 7 days, clearly demonstrating that linear carbon chain of n-butanol played a role. This also establishes that any alcohol, which is less polar than n-butanol (like alcohols containing higher carbons than n-butanol) can be used for this purpose.

The table shows that n-butanol has highest stability as compared to iso-butanol and tertiary butanol.

Role of Linear Chain of Alcohols in Stabilization of Natural Oil Blends with Diesel Sample details are:

|  | Percentage of diesel | Percentage of *jatropha* seed oil (SVO) | Percentage of n-butanol | Percentage of t-butanol | Percentage of Iso-butanol |
|---|---|---|---|---|---|
| Sample 1 | 100 | — | — | — | — |
| Sample 2 | — | 100 | — | — | — |
| Sample 3 | — | — | 100 | — | — |
| Sample 4 | — | — | — | 100 | — |
| Sample 5 | — | — | — | — | 100 |
| Sample 6 | 95 | 5 | — | — | — |
| Sample 7 | 90 | 10 | — | — | — |
| Sample 8 | 90 | 5 | 5 | — | — |
| Sample 9 | 85 | 10 | 5 | — | — |
| Sample 10 | 90 | 5 | — | 5 | — |
| Sample 11 | 85 | 10 | — | 5 | — |
| Sample 12 | 90 | 5 | — | — | 5 |
| Sample 13 | 85 | 10 | — | — | 5 |

Results of the experiment are

|  | 0 Days | 1 Days | 7 Days | 30 Days | 90 Days | 180 Days |
|---|---|---|---|---|---|---|
| Sample 1 | No precipitate | No precipitate | No precipitate | No precipitate | No precipitate | No precipitate |
| Sample 2 | No precipitate | No precipitate | No precipitate | No precipitate | No precipitate | No precipitate |
| Sample 3 | No precipitate | No precipitate | No precipitate | No precipitate | No precipitate | No precipitate |
| Sample 4 | No precipitate | No precipitate | No precipitate | No precipitate | No precipitate | No precipitate |
| Sample 5 | No precipitate | No precipitate | No precipitate | No precipitate | No precipitate | No precipitate |
| Sample 6 | No precipitate | Precipitate | Precipitate | Precipitate | Precipitate | Precipitate |
| Sample 7 | Precipitate | Precipitate | Precipitate | Precipitate | Precipitate | Precipitate |
| Sample 8 | No precipitate | No precipitate | No precipitate | No precipitate | No precipitate | No precipitate |
| Sample 9 | No precipitate | No precipitate | No precipitate | No precipitate | No precipitate | No precipitate |
| Sample 10 | No precipitate | No precipitate | No precipitate | Precipitate | Precipitate | Precipitate |
| Sample 11 | No precipitate | No precipitate | Precipitate | Precipitate | Precipitate | Precipitate |
| Sample 12 | No precipitate | No precipitate | No precipitate | No precipitate | Precipitate | Precipitate |
| Sample 13 | No precipitate | No precipitate | No precipitate | Precipitate | Precipitate | Precipitate |

Though iso-butanol and t-butanol has same number of carbons as n-butanol, they fail to stabilize Jatropha seed oil (SVO) blend with diesel for more than 30 and 7 days respectively, clearly demonstrating that normal or linear carbon chain of n-butanol played a role. Iso-butanol cannot be used in the composition of present invention as it fails to stabilize blends of Jatropha seed oil (SVO) in diesel for at least 30 days.

The flash points of diesel blends of n-butanol, iso-butanol and tertiary butanol containing 10% Jatropha seed oil is as given in the table below.

| Sample No | Diesel | n-butanol | Iso-butanol | Tertiary butanol | *Jatropha* seed oil | Flash point (° C.) |
|---|---|---|---|---|---|---|
| 1 | 100 | | | | | 42 |
| 2 | | 100 | | | | 37 |
| 3 | | | 100 | | | 28 |
| 4 | | | | 100 | | 16 |
| 5 | | | | | 100 | >100 |
| 6 | 90 | 10 | | | | 37 |

-continued

| Sample No | Diesel | n-butanol | Iso-butanol | Tertiary butanol | *Jatropha* seed oil | Flash point (° C.) |
|---|---|---|---|---|---|---|
| 7 | 90 | | 10 | | | 29 |
| 8 | 90 | | | 10 | | 17 |
| 9 | 90 | | | | 10 | 52 |

-continued

| Sample No | Diesel | n-butanol | Iso-butanol | Tertiary butanol | *Jatropha* seed oil | Flash point (° C.) |
|---|---|---|---|---|---|---|
| 10 | 80 | 10 | | | 10 | 39 |
| 11 | 80 | | 10 | | 10 | 30 |
| 12 | 80 | | | 10 | 10 | 17 |
| 13 | 80 | 20 | | | | 37.5 |
| 14 | 80 | | 20 | | | 29 |
| 15 | 80 | | | 20 | | 17 |
| 16 | 80 | | | | 20 | 54 |

Current international norms require diesel to have at least 35° C. as flash point. Observing above results clearly demonstrates that only n-butanol meets the requirement of flashpoint for diesel. Iso-butanol and tertiary butanol have low flash point which makes them unfit as blends for diesel and natural oil. Thus it is evident that among the three forms of alcohol, only normal chain alcohol (n-butanol) is fit to stabilize blends of diesel and natural oil.

Performance of a Diesel Engine Fueled by Rapeseed Oil with Normal Chain Alcohols Sample details are:

| Sample number | Diesel | n-butanol | n-pentanol | n-hexanol | *Jatropha* seed oil |
|---|---|---|---|---|---|
| 1 | 100 | | | | |
| 2 | 90 | 10 | | | |
| 3 | 90 | | 10 | | |
| 4 | 90 | | | 10 | |
| 5 | 90 | | | | 10 |
| 6 | | | | 10 | 90 |
| 7 | | | 10 | | 90 |
| 8 | | 10 | | | 90 |
| 9 | | | | 20 | 80 |
| 10 | | | 20 | | 80 |
| 11 | | 20 | | | 80 |
| 12 | | | | 30 | 70 |
| 13 | | | 30 | | 70 |
| 14 | | 30 | | | 70 |
| 15 | | | | | 100 |

The results are

| Sample number | 1 day | 7 days | 14 days | 30 days | 90 days |
|---|---|---|---|---|---|
| 1 | No precipitate | No precipitate | No precipitate | No precipitate | No precipitate |
| 2 | No precipitate | No precipitate | No precipitate | No precipitate | No precipitate |
| 3 | No precipitate | No precipitate | No precipitate | No precipitate | No precipitate |
| 4 | No precipitate | No precipitate | No precipitate | No precipitate | No precipitate |
| 5 | Precipitate | Precipitate | Precipitate | Precipitate | Precipitate |
| 6 | No precipitate | No precipitate | No precipitate | No precipitate | Precipitate |
| 7 | No precipitate | No precipitate | No precipitate | No precipitate | Precipitate |
| 8 | No precipitate | No precipitate | No precipitate | No precipitate | Precipitate |
| 9 | No precipitate | No precipitate | No precipitate | Precipitate | Precipitate |
| 10 | No precipitate | No precipitate | No precipitate | Precipitate | Precipitate |
| 11 | No precipitate | No precipitate | No precipitate | Precipitate | Precipitate |
| 12 | No precipitate | No precipitate | Precipitate | Precipitate | Precipitate |
| 13 | No precipitate | No precipitate | Precipitate | Precipitate | Precipitate |
| 14 | No precipitate | No precipitate | Precipitate | Precipitate | Precipitate |
| 15 | No precipitate | No precipitate | No precipitate | No precipitate | No precipitate |

The above experiment demonstrates that the blends of Jatropha seed oil (SVO) and normal chain alcohols (n-butanol, n-hexanol, n-pentanol) are not stable in solution for more than 30 days. When alcohol percentage in blend is increased to 20%, the stability decreased to 14 days and when the alcohol percentage is increased to 30%, the stability reduced to one week. This clearly demonstrates that, natural oil blends of normal chain alcohols have less stability and they can be used only in the form of diesel blends of natural oil and normal chain alcohols.

Physico Chemical Analysis of Diesel Blends of Natural Oil in Presence and Absence of Linear Chain Alcohols Sample: Commercial Diesel (100% Diesel)

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | <0.05 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.25 | 0.30 max | 0.3 max | IS: 1448 (P: 8) |
| 5. | Cetane Index | 53 | 46 min | 48 min | ASTM D 4737 |
| 6. | Pour Point, ° C. | −15 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | Distillation Recovery, % by vol. | | | | |
| a. | At 350° C. | 90 | 85 min | 85 min | IS: 1448 (P: 18) |
| b. | At 370° C. | 97 | 95 min | 95 min | IS: 1448 (P: 18) |
| 9. | Flash Point, (Abel), ° C. | 38 | 35 min | 35 min | IS: 1448 (P: 20) |
| 10. | Kinematic Viscosity @ 40° C., cSt | 2.28 | 2.0-5.0 | 2.0-5.0 | IS: 1448 (P: 25) |
| 11. | Sediments, % by wt., | 0.02 | 0.05 max | 0.05 max | IS: 1448 (P: 30) |
| 12. | Density @ 15° C., Kg/m$^3$ | 818.9 | 820-860 | 820-860 | IS: 1448 (P: 16) |
| 13. | Total Sulphur, % by wt., | 0.04 | 0.25 max | 0.05 max | IS: 1448 (P: 33) |

-continued

| No. | PARAMETERS | RESULTS | Requirements as per IS: 1460: 2000 | Requirements as per IS: 1460: 2005 | PROTOCOL |
|---|---|---|---|---|---|
| 14. | Water Content, ppm by wt., | 205 | 500 max | 500 max | IS: 1448 (P: 40) |

Sample: 90% Diesel, 10% n-butanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | 0.20 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.3 | 0.30 max | 0.3 max | IS: 1448 (P: 8) |
| 5. | Cetane Index | 51 | 46 min | 48 min | ASTM D 4737 |
| 6. | Pour Point, °C. | −12 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | | | Distillation Recovery, % by vol. | | |
| A | At 350° C. | 85 | 85 min | 85 min | IS: 1448 (P: 18) |
| B | At 370° C. | 96 | 95 min | 95 min | IS: 1448 (P: 18) |
| 9. | Flash Point, (Abel), °C. | 48 | 35 min | 35 min | IS: 1448 (P: 20) |
| 10. | Kinematic Viscosity @ 40° C., cSt | 3.22 | 2.0-5.0 | 2.0-5.0 | IS: 1448 (P: 25) |
| 11. | Sediments, % by wt., | 0.02 | 0.05 max | 0.05 max | IS: 1448 (P: 30) |
| 12. | Density @ 15° C., Kg/m$^3$ | 830.9 | 820-860 | 820-860 | IS: 1448 (P: 16) |
| 13. | Total Sulphur, % by wt., | 0.04 | 0.25 max | 0.05 max | IS: 1448 (P: 33) |
| 14. | Water Content, ppm by wt., | 178 | 500 max | 500 max | IS: 1448 (P: 40) |

Sample: 90% Diesel, 10% Jatropa Oil (Transesterified)

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | 0.13 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.29 | 0.30 max | 0.3 max | IS: 1448 (P: 8) |
| 5. | Cetane Index | 53 | 46 min | 48 min | ASTM D 4737 |
| 6. | Pour Point, °C. | −6 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | | | Distillation Recovery, % by vol. | | |
| a | At 350° C. | 85 | 85 min | 85 min | IS: 1448 (P: 18) |
| b | At 370° C. | 95 | 95 min | 95 min | IS: 1448 (P: 18) |
| 9. | Flash Point, (Abel), °C. | 42 | 35 min | 35 min | IS: 1448 (P: 20) |
| 10. | Kinematic Viscosity @ 40° C., cSt | 2.79 | 2.0-5.0 | 2.0-5.0 | IS: 1448 (P: 25) |
| 11. | Sediments, % by wt., | 0.03 | 0.05 max | 0.05 max | IS: 1448 (P: 30) |
| 12. | Density @ 15° C., Kg/m$^3$ | 826.4 | 820-860 | 820-860 | IS: 1448 (P: 16) |

-continued

| No. | PARAMETERS | RESULTS | Requirements as per IS: 1460: 2000 | Requirements as per IS: 1460: 2005 | PROTOCOL |
|---|---|---|---|---|---|
| 13. | Total Sulphur, % by wt., | 0.03 | 0.25 max | 0.05 max | IS: 1448 (P: 33) |
| 14. | Water Content, ppm by wt., | 240 | 500 max | 500 max | IS: 1448 (P: 40) |

Sample: 90% Diesel, 10% Jatropa Oil (SVO)

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | 0.09 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.69 | 0.30 max | 0.3 max | IS: 1448 (P: 8) |
| 5. | Cetane Index | 51 | 46 min | 48 min | ASTM D 4737 |
| 6. | Pour Point, °C. | −6 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | Distillation Recovery, % by vol. | | | | |
| a | At 350° C. | 85 | 85 min | 85 min | IS: 1448 (P: 18) |
| b | At 370° C. | 95 | 95 min | 95 min | IS: 1448 (P: 18) |
| 9. | Flash Point, (Abel), °C. | 48 | 35 min | 35 min | IS: 1448 (P: 20) |
| 10. | Kinematic Viscosity @ 40° C., cSt | 2.98 | 2.0-5.0 | 2.0-5.0 | IS: 1448 (P: 25) |
| 11. | Sediments, % by wt., | 0.08 | 0.05 max | 0.05 max | IS: 1448 (P: 30) |
| 12. | Density @ 15° C., Kg/m$^3$ | 832 | 820-860 | 820-860 | IS: 1448 (P: 16) |
| 13. | Total Sulphur, % by wt., | 0.12 | 0.25 max | 0.05 max | IS: 1448 (P: 33) |
| 14. | Water Content, ppm by wt., | 272 | 500 max | 500 max | IS: 1448 (P: 40) |

Sample: 10% Sunflower Oil (SVO), 90% Diesel

| S. No. | PARAMETERS | RESULTS | Requirements as per IS: 1460: 2005 | PROTOCOL |
|---|---|---|---|---|
| 1. | Acidity Inorganic | Nil | Nil | IS: 1448 (P: 2) |
| 2. | Total Acidity, mg KOH/g | 0.01 | To Report | IS: 1448 (P: 2) |
| 3. | Ash, % by wt., | 0.001 | 0.01 max | IS: 1448 (P: 4) |
| 4. | Carbon Residue Ramsbottom, on 10% residue by wt., | 0.54 | 0.3 max | IS: 1448 (P: 8) |
| 5. | Cetane Index | 57 | 48 min | ASTM D 976 |
| 6. | Pour Point. ° c. | −12 | 3 max | IS: 1448 (P-10) |
| 7. | Copper Strip Corrosion for 3 Hrs @ 100° C. | 1a | Not Worse than No. 1 | IS: 1448 (P-15) |
| 8. | Distillation Recovery, Temp Uc | | | |
| a | at 350° C. | 86 | 85 min | IS: 1448 (P: 18) |
| b | at 370° C. | 97 | 95 min | IS: 1448 (P: 18) |
| 9. | Flash Point (Abel), ° c. | 50 | 35 min | IS: 1448 (P: 20) |
| 10. | Kinematic Viscosity @ 40° C. cSt | 2.84 | 2.0-5.0 | IS: 1448 (P: 25) |
| 11. | Sediments, % by wt., | 0.026 | 0.05 max | IS: 1448 (P: 37) |
| 12. | Density @ 15° C. g/ml | 0.8264 | 820-860 | IS: 1448 (P: 16) |
| 13. | Total Sulphur, % by wt., | 0.14 | 0.05 max | IS: 1448 (P: 33) |
| 14. | Water Content, ppm by wt., | 179 | 500 max | IS: 1448 (P: 40) |

Sample: 10% Neem Seed Oil (SVO), 90% Diesel

| S. No. | PARAMETERS | RESULTS | Requirements as per IS: 1460: 2005 | PROTOCOL |
|---|---|---|---|---|
| 1. | Acidity Inorganic | Nil | Nil | IS: 1448 (P: 2) |
| 2. | Total Acidity, mg KOH/g | 0.85 | To Report | IS: 1448 (P: 2) |
| 3. | Ash, % by wt., | 0.001 | 0.01 max | IS: 1448 (P: 4) |
| 4. | Carbon Residue Ramsbottom, on 10% residue by wt., | 0.96 | 0.3 max | IS: 1448 (P: 8) |
| 5. | Cetane Index | 53 | 48 min | ASTM D 976 |
| 6. | Pour Point ° c. | −18 | 3 max | IS: 1448 (P-10) |
| 7. | Copper Strip Corrosion for 3 Hrs @ 100° C. | 1a | Not Worse than No. 1 | IS: 1448 (P-15) |
| 8. | Distillation Recovery, Temp ° c. | | | |
| a | at 350° C. | 88 | 85 min | IS: 1448 (P: 18) |
| b | at 370° C. | 96 | 95 min | IS: 1448 (P: 18) |
| 9. | Flash Point (Abel) ° c. | 44 | 35 min | IS: 1448 (P: 20) |
| 10. | Kinematic Viscosity @ 40° C. cSt | 2.04 | 2.0-5.0 | IS: 1448 (P: 25) |
| 11. | Sediments, % by wt., | 0.012 | 0.05 max | IS: 1448 (P: 37) |
| 12. | Density @ 15° C. Q/ml | 0.8308 | 820-860 | IS: 1448 (P: 16) |
| 13. | Total Sulphur, % by wt., | 0.14 | 0.05 max | IS: 1448 (P: 33) |
| 14. | Water Content, ppm by wt., | 259 | 500 max | IS: 1448 (P: 40) |

Sample: 85% Diesel, 7.5% Jatropa Oil, 7.5% n-butanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | 0.12 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.29 | 0.30 max | 0.3 max | IS: 1448 (P: 8) |
| 5. | Cetane Index | 52 | 46 min | 48 min | ASTM D 4737 |
| 6. | Pour Point, ° C. | −12 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | Distillation Recovery, % by vol. | | | | |
| A | At 350° C. | 85 | 85 min | 85 min | IS: 1448 (P: 18) |
| B | At 370° C. | 96 | 95 min | 95 min | IS: 1448 (P: 18) |
| 9. | Flash Point, (Abel), ° C. | 48 | 35 min | 35 min | IS: 1448 (P: 20) |
| 10. | Kinematic Viscosity @ 40° C., cSt | 3.61 | 2.0-5.0 | 2.0-5.0 | IS: 1448 (P: 25) |
| 11. | Sediments, % by wt., | 0.03 | 0.05 max | 0.05 max | IS: 1448 (P: 30) |
| 12. | Density @ 15° C., Kg/m³ | 836.9 | 820-860 | 820-860 | IS: 1448 (P: 16) |
| 13. | Total Sulphur, % by wt., | 0.04 | 0.25 max | 0.05 max | IS: 1448 (P: 33) |
| 14. | Water Content, ppm by wt., | 239 | 500 max | 500 max | IS: 1448 (P: 40) |

Sample: 80% Diesel, 10% Jatropa Oil, 10% n-butanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | 0.1 | 0.20 max | To Report | IS: 1448 (P: 2) |
| 3. | Ash, % by wt., | <0.001 | 0.01 max | 0.01 max | IS: 1448 (P: 4) |

-continued

| No. | PARAMETERS | RESULTS | Requirements as per IS: 1460: 2000 | Requirements as per IS: 1460: 2005 | PROTOCOL |
|---|---|---|---|---|---|
| 4. | Carbon Residue Ramsbottom, on 10% residue by wt., | 0.29 | 0.30 max | 0.3 max | IS: 1448 (P: 8) |
| 5. | Cetane Index | 50 | 46 min | 48 min | ASTM D 4737 |
| 6. | Pour Point, °C. | −12 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | | Distillation Recovery, % by vol. | | | |
| A | At 350° C. | 85 | 85 min | 85 min | IS: 1448 (P: 18) |
| B | At 370° C. | 96 | 95 min | 95 min | IS: 1448 (P: 18) |
| 9. | Flash Point, (Abel), °C. | 46 | 35 min | 35 min | IS: 1448 (P: 20) |
| 10. | Kinematic Viscosity @ 40° C., cSt | 4.29 | 2.0-5.0 | 2.0-5.0 | IS: 1448 (P: 25) |
| 11. | Sediments, % by wt., | 0.03 | 0.05 max | 0.05 max | IS: 1448 (P: 30) |
| 12. | Density @ 15° C., Kg/m$^3$ | 841.9 | 820-860 | 820-860 | IS: 1448 (P: 16) |
| 13. | Total Sulphur, % by wt., | 0.04 | 0.25 max | 0.05 max | IS: 1448 (P: 33) |
| 14. | Water Content, ppm by wt., | 237 | 500 max | 500 max | IS: 1448 (P: 40) |

Sample: 85% Diesel, 7.5% Neem oil, 7.5% n-butanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | 0.08 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.27 | 0.30 max | 0.3 max | IS: 1448 (P: 8) |
| 5. | Cetane Index | 51 | 46 min | 48 min | ASTM D 4737 |
| 6. | Pour Point, °C. | −11 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | | Distillation Recovery, % by vol. | | | |
| A | At 350° C. | 87 | 85 min | 85 min | IS: 1448 (P: 18) |
| B | At 3700 C. | 97 | 95 min | 95 min | IS: 1448 (P: 18) |
| 9. | Flash Point, (Abel), °C. | 39 | 35 min | 35 min | IS: 1448 (P: 20) |
| 10. | Kinematic Viscosity @ 400 C., cSt | 3.11 | 2.0-5.0 | 2.0-5.0 | IS: 1448 (P: 25) |
| 11. | Sediments, % by wt., | 0.02 | 0.05 max | 0.05 max | IS: 1448 (P: 30) |
| 12. | Density @ 150 C., Kg/m$^3$ | 829.7 | 820-860 | 820-860 | IS: 1448 (P: 16) |
| 13. | Total Sulphur, % by wt., | 0.05 | 0.25 max | 0.05 max | IS: 1448 (P: 33) |
| 14. | Water Content, ppm by wt, | 228 | 500 max | 500 max | IS: 1448 (P: 40) |

Sample: 80% Diesel, 10% Neem Oil, 10% n-butanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | 0.12 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.29 | 0.30 max | 0.3 max | IS: 1448 (P: 8) |
| 5. | Cetane Index | 50 | 46 min | 48 min | ASTM D 4737 |
| 6. | Pour Point, °C. | −11 | 3 max | 3 max | IS: 1448 (P-10) |

-continued

| No. | PARAMETERS | RESULTS | Requirements as per IS: 1460: 2000 | Requirements as per IS: 1460: 2005 | PROTOCOL |
|---|---|---|---|---|---|
| 7. | Copper Strip Corrosion for 3 Hrs @ 100° C. | 1a | Not worse than No. 1 | Not worse than No. 1 | IS: 1448 (P-15) |
| 8. | | Distillation Recovery, % by vol. | | | |
| A | At 350° C. | 86 | 85 min | 85 min | IS: 1448 (P: 18) |
| B | At 370° C. | 95 | 95 min | 95 min | IS: 1448 (P: 18) |
| 9. | Flash Point, (Abel), ° C. | 38 | 35 min | 35 min | IS: 1448 (P: 20) |
| 10. | Kinematic Viscosity @ 40° C., cSt | 3.78 | 2.0-5.0 | 2.0-5.0 | IS: 1448 (P: 25) |
| 11. | Sediments, % by wt., | 0.03 | 0.05 max | 0.05 max | IS: 1448 (P: 30) |
| 12. | Density @ 15° C., Kg/m$^3$ | 835.7 | 820-860 | 820-860 | IS: 1448 (P: 16) |
| 13. | Total Sulphur, % by wt., | 0.05 | 0.25 max | 0.05 max | IS: 1448 (P: 33) |
| 14. | Water Content, ppm by wt., | 273 | 500 max | 500 max | IS: 1448 (P: 40) |

Sample: 90% Diesel, 5% Neem Oil, 5% n-butanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | <0.05 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.26 | 0.30 max | 0.3 max | IS: 1448 (P: 8) |
| 5. | Cetane Index | 52 | 46 min | 48 min | ASTM D 4737 |
| 6. | Pour Point, ° C. | −11 | 3 max | 3 max | IS: 1448 (P-10) |
| 7. | Copper Strip Corrossion for 3 Hrs @ 1000 C. | 1a | Not worse than No. 1 | Not worse than No. 1 | IS: 1448 (P-15) |
| 8. | | Distillation Recovery, % by vol. | | | |
| a | At 350° C. | 90 | 85 min | 85 min | IS: 1448 (P: 18) |
| b | At 370° C. | 97 | 95 min | 95 min | IS: 1448 (P: 18) |
| 9. | Flash Point, (Abel), ° C. | 37 | 35 min | 35 min | IS: 1448 (P: 20) |
| 10. | Kinematic Viscosity @ 40° C., cSt | 2.81 | 2.0-5.0 | 2.0-5.0 | IS: 1448 (P: 25) |
| 11. | Sediments, % by wt., | 0.04 | 0.05 max | 0.05 max | IS: 1448 (P: 30) |
| 12. | Density @ 15° C., Kg/m$^3$ | 827.3 | 820-860 | 820-860 | IS: 1448 (P: 16) |
| 13. | Total Sulphur, % by wt., | 0.04 | 0.25 max | 0.05 max | IS: 1448 (P: 33) |
| 14. | Water Content, ppm by wt., | 198 | 500 max | 500 max | IS: 1448 (P: 40) |

Sample: 85% Diesel, 7.5% Sunflower Oil, 7.5% n-butanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | <0.05 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.29 | 0.30 max | 0.3 max | IS: 1448 (P: 8) |
| 5. | Cetane Index | 53 | 46 min | 48 min | ASTM D 4737 |
| 6. | Pour Point, ° C. | −10 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |

-continued

| No. | PARAMETERS | RESULTS | Requirements as per IS: 1460: 2000 | Requirements as per IS: 1460: 2005 | PROTOCOL |
|---|---|---|---|---|---|
| 8. | | Distillation Recovery, % by vol. | | | |
| a | At 350° C. | 88 | 85 min | 85 min | IS: 1448 (P: 18) |
| b | At 370° C. | 96 | 95 min | 95 min | IS: 1448 (P: 18) |
| 9. | Flash Point, (Abel), ° C. | 37 | 35 min | 35 min | IS: 1448 (P: 20) |
| 10. | Kinematic Viscosity @ 40° C., cSt | 2.92 | 2.0-5.0 | 2.0-5.0 | IS: 1448 (P: 25) |
| 11. | Sediments, % by wt., | 0.05 | 0.05 max | 0.05 max | IS: 1448 (P: 30) |
| 12. | Density @ 15° C., Kg/m$^3$ | 832 | 820-860 | 820-860 | IS: 1448 (P: 16) |
| 13. | Total Sulphur, % by wt., | 0.05 | 0.25 max | 0.05 max | IS: 1448 (P: 33) |
| 14. | Water Content, ppm by wt., | 175 | 500 max | 500 max | IS: 1448 (P: 40) |

Sample: 90% Diesel, 5% Sunflower Oil, 5% n-butanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | <0.05 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.24 | 0.30 max | 0.3 max | IS: 1448 (P: 8) |
| 5. | Cetane Index | 52 | 46 min | 48 min | ASTM D 4737 |
| 6. | Pour Point, ° C. | −10 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | | Distillation Recovery, % by vol. | | | |
| a | At 350° C. | 94 | 85 min | 85 min | IS: 1448 (P: 18) |
| b | At 370° C. | 97 | 95 min | 95 min | IS: 1448 (P: 18) |
| 9. | Flash Point, (Abel), ° C. | 37 | 35 min | 35 min | IS: 1448 (P: 20) |
| 10. | Kinematic Viscosity @ 40° C., cSt | 2.61 | 2.0-5.0 | 2.0-5.0 | IS: 1448 (P: 25) |
| 11. | Sediments, % by wt., | 0.01 | 0.05 max | 0.05 max | IS: 1448 (P: 30) |
| 12. | Density @ 15° C, Kg/m$^3$ | 820 | 820-860 | 820-860 | IS: 1448 (P: 16) |
| 13. | Total Sulphur, % by wt., | 0.03 | 0.25 max | 0.05 max | IS: 1448 (P: 33) |
| 14. | Water Content, ppm by wt., | 156 | 500 max | 500 max | IS: 1448 (P: 40) |

Sample: 80% Diesel, 10% Sunflower Oil, 10% n-butanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | <0.05 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.30 | 0.30 max | 0.3 max | IS: 1448 (P: 8) |
| 5. | Cetane Index | 53 | 46 min | 48 min | ASTM D 4737 |
| 6. | Pour Point, ° C. | −11 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | | Distillation Recovery, % by vol. | | | |
| a | At 350° C. | 86 | 85 min | 85 min | IS: 1448 (P: 18) |
| b | At 370° C. | 96 | 95 min | 95 min | IS: 1448 (P: 18) |

-continued

| No. | PARAMETERS | RESULTS | Requirements as per IS: 1460: 2000 | Requirements as per IS: 1460: 2005 | PROTOCOL |
|---|---|---|---|---|---|
| 9. | Flash Point, (Abel), °C. | 38 | 35 min | 35 min | IS: 1448 (P: 20) |
| 10. | Kinematic Viscosity @ 400 C., cSt | 3.02 | 2.0-5.0 | 2.0-5.0 | IS: 1448 (P: 25) |
| 11. | Sediments, % by wt., | 0.05 | 0.05 max | 0.05 max | IS: 1448 (P: 30) |
| 12. | Density @ 15° C., Kg/m$^3$ | 843 | 820-860 | 820-860 | IS: 1448 (P: 16) |
| 13. | Total Sulphur, % by wt., | 0.05 | 0.25 max | 0.05 max | IS: 1448 (P: 33) |
| 14. | Water Content, ppm by wt., | 205 | 500 max | 500 max | IS: 1448 (P: 40) |

Sample: 80% Diesel, 10% Jatropa Oil, 10% Cardanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | <0.05 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.27 | 0.30 max | 0.3 max | IS: 1448 (P: 8) |
| 5. | Cetane Index | 53 | 46 min | 48 min | ASTM D 4737 |
| 6. | Pour Point, °C. | −12 | 3 max | 3 max | IS: 1448 (P-10) |
| 7. | Copper Strip Corrossion for 3 Hrs @ 100° C. | 1a | Not worse than No. 1 | Not worse than No. 1 | IS: 1448 (P-15) |
| 8. | Distillation Recovery, % by vol. | | | | |
| a | At 350° C. | 90 | 85 min | 85 min | IS: 1448 (P: 18) |
| b | At 370° C. | 97 | 95 min | 95 min | IS: 1448 (P: 18) |
| 9. | Flash Point, (Abel), °C. | 46 | 35 min | 35 min | IS: 1448 (P: 20) |
| 10. | Kinematic Viscosity @ 40° C., cSt | 2.71 | 2.0-5.0 | 2.0-5.0 | IS: 1448 (P: 25) |
| 11. | Sediments, % by wt., | 0.03 | 0.05 max | 0.05 max | IS: 1448 (P: 30) |
| 12. | Density @15° C., Kg/m$^3$ | 827.9 | 820-860 | 820-860 | IS: 1448 (P: 16) |
| 13. | Total Sulphur, % by wt., | 0.01 | 0.25 max | 0.05 max | IS: 1448 (P: 33) |
| 14. | Water Content, ppm by wt., | 178 | 500 max | 500 max | IS: 1448 (P: 40) |

Sample: 85% Diesel, 7.5% Jatropa Oil, 7.5% Cardanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | <0.05 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.29 | 0.30 max | 0.3 max | IS: 1448 (P: 8) |
| 5. | Cetane Index | 52 | 46 min | 48 min | ASTM D 4737 |
| 6. | Pour Point, °C. | −9 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | Distillation Recovery, % by vol. | | | | |
| a | At 350° C. | 88 | 85 min | 85 min | IS: 1448 (P: 18) |
| b | At 370° C. | 96 | 95 min | 95 min | IS: 1448 (P: 18) |
| 9. | Flash Point, (Abel), °C. | 50 | 35 min | 35 min | IS: 1448 (P: 20) |
| 10. | Kinematic Viscosity @ 40° C., cSt | 2.89 | 2.0-5.0 | 2.0-5.0 | IS: 1448 (P: 25) |

| No. | PARAMETERS | RESULTS | Requirements as per IS: 1460: 2000 | Requirements as per IS: 1460: 2005 | PROTOCOL |
|---|---|---|---|---|---|
| 11. | Sediments, % by wt., | 0.03 | 0.05 max | 0.05 max | IS: 1448 (P: 30) |
| 12. | Density @ 15° C., Kg/m³ | 833.9 | 820-860 | 820-860 | IS: 1448 (P: 16) |
| 13. | Total Sulphur, % by wt., | 0.05 | 0.25 max | 0.05 max | IS: 1448 (P: 33) |
| 14. | Water Content, ppm by wt., | 185 | 500 max | 500 max | IS: 1448 (P: 40) |

Sample: 90% Diesel, 5% Jatropa Oil, 5% n-butanol

| No. | PARAMETERS | RESULTS | Requirements as per IS: 1460: 2000 | Requirements as per IS: 1460: 2005 | PROTOCOL |
|---|---|---|---|---|---|
| 1. | Acidity Inorganic | Nil | Nil | Nil | IS: 1448 (P: 2) |
| 2. | Total Acidity, mg KOH/g | <0.05 | 0.20 max | To Report | IS: 1448 (P: 2) |
| 3. | Ash, % by wt., | <0.001 | 0.01 max | 0.01 max | IS: 1448 (P: 4) |
| 4. | Carbon Residue Ramsbottom, on 10% residue by wt., | 0.26 | 0.30 max | 0.3 max | IS: 1448 (P: 8) |
| 5. | Cetane Index | 52 | 46 min | 48 min | ASTM D 4737 |
| 6. | Pour Point, ° C. | −9 | 3 max | 3 max | IS: 1448 (P-10) |
| 7. | Copper Strip Corrosion for 3 Hrs @ 100° C. | 1a | Not worse than No. 1 | Not worse than No. 1 | IS: 1448 (P-15) |
| 8. | | Distillation Recovery, % by vol. | | | |
| a | At 350° C. | 94 | 85 min | 85 min | IS: 1448 (P: 18) |
| b | At 370° C. | 97 | 95 min | 95 min | IS: 1448 (P: 18) |
| 9. | Flash Point, (Abel), ° C. | 48 | 35 min | 35 min | IS: 1448 (P: 20) |
| 10. | Kinematic Viscosity @ 40° C., cSt | 2.62 | 2.0-5.0 | 2.0-5.0 | IS: 1448 (P: 25) |
| 11. | Sediments, % by wt., | 0.01 | 0.05 max | 0.05 max | IS: 1448 (P: 30) |
| 12. | Density @15° C., Kg/m³ | 820.9 | 820-860 | 820-860 | IS: 1448 (P: 16) |
| 13. | Total Sulphur, % by wt., | 0.04 | 0.25 max | 0.05 max | IS: 1448 (P: 33) |
| 14. | Water Content, ppm by wt., | 178 | 500 max | 500 max | IS: 1448 (P: 40) |

The physico chemical analysis was done as per IS: 1460: 2000 and IS: 1460: 2005, the Indian standard for euro diesel. The analysis was done immediately after preparing the samples. As evident from the above data, the physico chemical characteristics of the blends of n-butanol with natural oils (Sunflower oil, Jatropa oil, neem seed oil) and diesel satisfy the parameters of IS: 1460: 2000 and IS: 1460: 2005, while the combination of natural oil and diesel does not.

Engine Testing of Natural Oil as Blend of Diesel—Effect of n-butanol and Cardanol on Engine Performance and Emission Engine Specification:
Make: Kirloskar oil engines
No of cylinders: twin cylinder
Bore: 102 mm
Stroke: 116 mm
Displacement: 1.896 liters
Compression ratio: 17.5
Bhp: 20 hp
Injection pressure: 185 bar
Loading Sequence Followed:
a) No load (0)
b) 3.1 kW
c) 6.1 kW
d) 9.1 kW
e) 11.1 kW Pressure sensor: Kistler (maximum pressure: 250 bar)
ASTM standards are followed to measure the air flow using an air drum with a calibrated orifice and a manometer
Measured room temperature: 30±3° C.
Air density: 1.164 Kg/m³
Test Parameters:
mf/min: Grams of fuel consumed per minute
Load kW: Load applied for specific study
Rpm: Engine rotations per minute
HC: Total hydrocarbons produced in exhaust smoke
CO: Total carbon monoxide produced in exhaust smoke
CO2: Total carbon dioxide produced in exhaust smoke For each fuel blend, three separate experiments (sets 1-3) were done and average was taken. Engine was off for atleast one hour between experiments involving same fuel and three hours when engine was switched to a new fuel. For every experiment, engine was run for atleast 30 mins to get rid of any residual fuel in fuel lines before recording parameters.

The tested samples are
Commercial diesel
Sample 1: 90% Diesel, 5% Jatropha oil (SVO), 5% n-butanol
Sample 2: 85% Diesel, 7.5% Jatropha oil (SVO), 7.5% n-butanol Sample 3: 80% Diesel, 10% Jatropha oil (SVO), 10% n-butanol Sample 4: 95% Diesel, 5% n-butanol Sample 5: 90% Diesel, 10% n-butanol Sample 6: 90% Diesel, 5% Jatropha oil (SVO), 5% Cardanol Sample 7: 85% Diesel, 7.5% Jatropha oil (SVO), 7.5% Cardanol Sample 8: 80% Diesel, 10% Jatropha oil (SVO), 10% Cardanol Sample 9: 95% Diesel, 5% Cardanol Sample 10: 90% Diesel, 10% Jatropha oil (SVO)

Sample 11: 90% Diesel, 10% Jatropha biodiesel (transesterified)

Sample 12: 85% Diesel, 15% Jatropha biodiesel (transesterified)

Hydrocarbon Emissions from Exhaust for Above Samples

| Hydrocarbon vs Load | | | | | | |
|---|---|---|---|---|---|---|
| Load | Diesel | Sample 1 | Sample 2 | Sample 3 | Sample 4 | Sample 5 | Sample 6 |
| 0 | 24.0 | 24 | 30.0 | 34.0 | 31.5 | 27.0 | 21.0 |
| 3 | 7.5 | 8 | 10.0 | 11.0 | 14.5 | 22.0 | 17.0 |
| 6.1 | 10.0 | 10.0 | 12.0 | 15.0 | 20.5 | 23.0 | 14.5 |
| 9 | 20.0 | 16.5 | 18.0 | 19.5 | 21.5 | 25.5 | 26.0 |
| 11.1 | 31.0 | 27.5 | 31 | 32 | 35.5 | 38.5 | 43.0 |
| Load | Sample 7 | Sample 8 | Sample 9 | Sample 10 | Sample 11 | Sample 12 |
| 0 | 21.0 | 16.0 | 35. | 40.0 | 26.5 | 32.0 |
| 3 | 13.5 | 15.0 | 18. | 20.0 | 17.0 | 19.5 |
| 6.1 | 14.5 | 15.5 | 20.0 | 23.0 | 14.0 | 15.5 |
| 9 | 24.5 | 32.0 | 35.0 | 38.0 | 18.0 | 22.0 |
| 11.1 | 36.5 | 40.0 | 43.0 | 49.0 | 34.5 | 38.0 |

Carbon Monoxide Emissions from Above Samples

| Carbon monoxide vs Load | | | | | | |
|---|---|---|---|---|---|---|
| Load | Diesel | Sample 1 | Sample 2 | Sample 3 | Sample 4 | Sample 5 | Sample 6 |
| 0 | 0.06 | 0.02 | 0.08 | 0.08 | 0.05 | 0.03 | 0.02 |
| 3 | 0.07 | 0.06 | 0.05 | 0.07 | 0.06 | 0.06 | 0.05 |
| 6.1 | 0.07 | 0.07 | 0.07 | 0.07 | 0.08 | 0.07 | 0.08 |
| 9 | 0.10 | 0.11 | 0.13 | 0.11 | 0.11 | 0.09 | 0.12 |
| 11.1 | 0.30 | 0.23 | 0.23 | 0.32 | 0.27 | 0.25 | 0.35 |
| Load | Sample 7 | Sample 8 | Sample 9 | Sample 10 | Sample 11 | Sample 12 |
| 0 | 0.02 | 0.06 | 0.09 | 0.10 | 0.07 | 0.07 |
| 3 | 0.07 | 0.10 | 0.12 | 0.09 | 0.09 | 0.08 |
| 6.1 | 0.08 | 0.13 | 0.17 | 0.20 | 0.09 | 0.10 |
| 9 | 0.13 | 0.18 | 0.24 | 0.35 | 0.13 | 0.12 |
| 11.1 | 0.43 | 0.45 | 0.47 | 0.56 | 0.30 | 0.36 |

Carbon Dioxide Emissions for Above Samples

| Carbon dioxide vs Load | | | | | | |
|---|---|---|---|---|---|---|
| Load | Diesel | Sample 1 | Sample 2 | Sample 3 | Sample 4 | Sample 5 | Sample 6 |
| 0 | 2.6 | 2.1 | 2.3 | 2.2 | 2.6 | 2.0 | 2.2 |
| 3 | 4.5 | 4.6 | 4.4 | 4.4 | 4.7 | 4.5 | 4.9 |
| 6.1 | 6.2 | 6.4 | 6.3 | 6.3 | 6.2 | 6.3 | 6.6 |
| 9 | 8.5 | 8.6 | 8.4 | 8.5 | 8.5 | 8.6 | 8.6 |
| 11.1 | 10.3 | 10.4 | 10.2 | 10.3 | 10.3 | 10.2 | 10.4 |
| Load | Sample 7 | Sample 8 | Sample 9 | Sample 10 | Sample 11 | Sample 12 |
| 0 | 2.1 | 2.7 | 2.9 | 3.1 | 2.8 | 2.2 |
| 3 | 4.6 | 4.6 | 4.9 | 5.6 | 4.5 | 4.4 |
| 6.1 | 6.5 | 6.4 | 6.6 | 7.5 | 6.4 | 6.3 |
| 9 | 8.7 | 8.9 | 8.7 | 10.6 | 8.6 | 8.5 |
| 11.1 | 10.5 | 10.6 | 10.4 | 12.4 | 10.1 | 10.1 |

Fuel Consumption for Above Samples

| Fuel consumption Vs Load | | | | | | | |
|---|---|---|---|---|---|---|---|
| Load | Diesel | Sample 1 | Sample 2 | Sample 3 | Sample 4 | Sample 5 | Sample 6 |
| 0.0 | 18.0 | 18.0 | 18.0 | 17.7 | 18.8 | 16.8 | 18.0 |
| 3.0 | 26.7 | 27.0 | 26.3 | 25.8 | 26.3 | 25.8 | 27.0 |
| 6.1 | 36.0 | 35.7 | 35.7 | 36.2 | 35.8 | 35.0 | 36.0 |
| 9.0 | 47.0 | 45.7 | 47.0 | 46.0 | 45.8 | 46.0 | 45.0 |
| 11.1 | 56.7 | 56.0 | 56.2 | 56.2 | 55.2 | 54.5 | 55.0 |

| Load | Sample 7 | Sample 8 | Sample 9 | Sample 10 | Sample 11 | Sample 12 |
|---|---|---|---|---|---|---|
| 0.0 | 16.8 | 16.7 | 19.0 | 19.8 | 18.0 | 18.0 |
| 3.0 | 25.8 | 26.0 | 27.8 | 29.7 | 26.3 | 26.0 |
| 6.1 | 35.2 | 36.0 | 37.8 | 39.7 | 35.7 | 35.8 |
| 9.0 | 45.7 | 46.5 | 49.0 | 49.7 | 46.0 | 46.0 |
| 11.1 | 56.0 | 57.3 | 58.8 | 59.7 | 55.0 | 56.0 |

Samples 1-3 (SVO-diesel blends with n-butanol), 6-8 (SVO-diesel blends with cardanol) have fuel parameters (both performance & emission) similar to Sample 11-12 (Biodiesel blends) and commercial diesel. This indicates the proposed normal chain alcohols enable the natural oil blends of diesel to behave similar to commercial diesel.

Engine Test—to Compare Opacity of Different Natural Oil Blends in Diesel

The separation of layers in natural oil-diesel blend cause improper spraying of blend, which results in increased smoke and addition of normal chain alcohols like n-butanol addresses the problem.

When a poor/uneven/non-uniform diesel or diesel blend is injected to diesel engine, due to formation of carbon black deposits on injector nozzle, there could be uneven spraying of fuel, which results in large amounts of smoke. Hence, in a uniform running engine, under standard operation conditions, sudden observance of large amounts of smoke can be attributed to uneven spraying of fuel which in turn can be used to identify faulty/bad fuel.

Experiment design: Diesel engine was connected with container having 10 liters of diesel and ran till it stopped. This was continued for three times and observed any awkward smoke increase. It was observed that engine on average run for 5 hours under a load of 6.1 kW. During last three minutes before stoppage, engine gave an up to 3 fold increase in smoke for all fuel blends and diesel. Similarly, when engine was cranked, first few seconds resulted in lot of smoke. Hence, it was concluded that just after cranking and just before stopping, engine tends to give more smoke. It was also observed that, even though engine was made to run at constant speed, due to constant running, there is a variation of up to 20% in smoke from the exhaust.

Test Conditions

Engine: A Kirloskar twin cylinder with 102 mm bore, 116 mm stroke, 1.9 liters displacement, with compression ratio of 17.5 and 20 hp diesel engine was used.

Total fuel added to storage tank: 10 liters of well mixed diesel

Total runtime: Approximately 5 hours

Engine speed (rpm): 1530±10, system tries to maintain constant speed by adjusting the fuel flow Opacity monitored window: 30 minutes after cranking engine and 30 minutes before engine self-stoppage (about 4 hours for each fuel blend and diesel).

Tolerable change in opacity: up to 50% change from average reading

Temperature of study: 30±5° C.

Number of tests per fuel/fuel blend: Three tests and average result is taken

Opacity: Usually after 15 minutes of cranking the engine, most of the residual fuel will be burnt and the opacity will be of the fuel being tested. Three readings were taken from the opacity between 20 and 30 minutes and average of that value is taken as the average opacity (starting value).

Sudden stoppage of engine: Sudden stoppage of engine on its own after 30 minutes equilibration (for next four hours) is monitored. In case of an engine stoppage, engine was restarted and five minutes equilibration window is provided before the parameters were recorded again.

It is important to note that the average opacity of specific fuel is compared with its number of times awkward changes in opacity (>50% of average value).

Sample Details:

Diesel: Bharat stage-III diesel from a commercial depot in Bangalore

Sample 1: 20% trans esterified (methyl) jatropha biodiesel, 80% of diesel

Sample 2: 10% trans esterified (methyl) jatropha biodiesel, 90% diesel

Sample 3: 20% Jatropha oil (SVO), 80% diesel

Sample 4: 10% Jatropha oil (SVO), 90% diesel

Sample 5: 5% Jatropha oil, 5% n-butanol, 90% diesel

Sample 6: 10% Jatropha oil, 10% n-butanol, 80% diesel

Sample 7: 5% Jatropha oil, 5% cardanol, 90% diesel

Sample 8: 10% Jatropha oil, 10% cardanol, 80% diesel

Between each experiment engine was off for minimum of 3 hours to let it cool.

Every time a fuel is run, fuel injector system was dismantled and cleaned (washing with diesel, opening nozzle and removing carbon and then checking whether nozzle moving freely, using copper brush remove carbon deposits, etc).

| Fuel/Fuel blend | Engine run time (min) | | | Average | Opacity (%) | | | Average | No of times spike (>50% increase) | | | Average | No of times sudden stoppage of engine | | | Average |
|---|---|---|---|---|---|---|---|---|---|---|---|---|---|---|---|---|
| Diesel | 312 | 324 | 317 | 317.7 | 21 | 22 | 23 | 22 | 0 | 1 | 1 | 0.7 | 0 | 0 | 0 | 0 |
| Sample 1 | 306 | 309 | 301 | 305.3 | 29 | 32 | 31 | 30.7 | 1 | 2 | 1 | 1.3 | 0 | 0 | 0 | 0 |

-continued

| Fuel/Fuel blend | Engine run time (min) | | | Average | Opacity (%) | | | Average | No of times spike (>50% increase) | | | Average | No of times sudden stoppage of engine | | | Average |
|---|---|---|---|---|---|---|---|---|---|---|---|---|---|---|---|---|
| Sample 2 | 311 | 306 | 322 | 313 | 20 | 22 | 22 | 21.3 | 1 | 1 | 0 | 0.7 | 0 | 0 | 0 | 0 |
| Sample 3 | 298 | 292 | 301 | 297 | 37 | 35 | 36 | 36 | 15 | 12 | 13 | 13.3 | 2 | 3 | 2 | 2.3 |
| Sample 4 | 287 | 289 | 291 | 289 | 31 | 29 | 28 | 29.3 | 7 | 8 | 9 | 8 | 1 | 1 | 1 | 1 |
| Sample 5 | 292 | 319 | 309 | 312.3 | 14 | 15 | 15 | 16.7 | 0 | 1 | 1 | 0.7 | 0 | 0 | 0 | 0 |
| Sample 6 | 309 | 327 | 322 | 319.3 | 19 | 17 | 19 | 18.3 | 1 | 2 | 1 | 1.3 | 0 | 0 | 0 | 0 |
| Sample 7 | 312 | 317 | 315 | 314.7 | 21 | 22 | 21 | 21.3 | 0 | 1 | 1 | 0.7 | 0 | 0 | 0 | 0 |
| Sample 8 | 329 | 333 | 317 | 326.3 | 27 | 29 | 29 | 28.3 | 1 | 1 | 1 | 1 | 0 | 0 | 0 | 0 |

It is clear from the above table that:

1. Total engine run times of samples containing blends of natural oil and diesel are lower. Addition of n-butanol to the blends of natural oil and diesel seem to address the problem.
2. Number of times engine stopped suddenly is higher for samples containing blends of natural oil and diesel. Addition of n-butanol to the blends of natural oil and diesel seem to address the problem.
3. Number of times spike or sudden increase in opacity observed was more for samples containing blends of natural oil and diesel. Addition of n-butanol to the blends of natural oil and diesel seem to address the problem.
4. Thus, it clearly demonstrates that there is improper running of engine when natural oil and diesel blends are used and addition of n-butanol (normal chain alcohols) to the blends of natural oil and diesel address this problem.

Decrease in NOx Due to Addition of n-butanol and n-hexanol

Engine: A Kirloskar twin cylinder with 102 mm bore, 116 mm stroke, 1.9 liters displacement, with compression ratio of 17.5 and 20 hp diesel engine was used.

| SI | mf/min | Load kW | rpm | Nox | Opacity | Egt |
|---|---|---|---|---|---|---|
| Diesel | | | | | | |
| 1 | 18 | 0 | 1588 | 135 | 2 | 187 |
| 1 | 18 | 0 | 1588 | 135 | 2 | 187 |
| 2 | 27 | 3.1 | 1551 | 430 | 10 | 242 |
| 3 | 36 | 6.1 | 1535 | 852 | 19 | 318 |
| 4 | 47 | 9 | 1506 | 1089 | 42 | 419 |
| 5 | 57 | 11.1 | 1490 | 1323 | 67 | 490 |
| 10% *Jatropha* SVO, 90% diesel | | | | | | |
| 1 | 20 | 0 | 1558 | 384 | 2 | 198 |
| 2 | 29 | 3.1 | 1556 | 650 | 13 | 257 |
| 3 | 38 | 6.1 | 1538 | 917 | 29 | 340 |
| 4 | 49 | 9.1 | 1513 | 1179 | 54 | 448 |
| 5 | 58 | 11.1 | 1496 | 1449 | 79 | 502 |
| 10% *Jatropha* SVO, 10% n-butanol, 80% diesel | | | | | | |
| 1 | 18 | 0 | 1562 | 221 | 2 | 185 |
| 2 | 27 | 3.1 | 1550 | 427 | 8 | 221 |
| 3 | 36 | 6 | 1531 | 833 | 19 | 284 |
| 4 | 46 | 9 | 1510 | 1000 | 35 | 409 |
| 5 | 56 | 11 | 1497 | 1080 | 60 | 491 |
| 10% *Jatropha* trans esterified biodiesel, 90% diesel | | | | | | |
| 1 | 19 | 0 | 1576 | 147 | 1 | 183 |
| 2 | 28 | 3.1 | 1548 | 447 | 10 | 251 |
| 3 | 39 | 6 | 1533 | 711 | 19 | 339 |
| 4 | 48 | 9 | 1507 | 999 | 42 | 437 |
| 5 | 59 | 11.1 | 1492 | 1381 | 66 | 506 |
| 10% *Jatropha* SVO, 10% n-hexanol, 80% diesel | | | | | | |
| 1 | 18 | 0 | 1547 | 235 | 1 | 179 |
| 2 | 27 | 3.1 | 1545 | 410 | 16 | 236 |
| 3 | 36 | 6 | 1537 | 810 | 38 | 310 |
| 4 | 48 | 9 | 1511 | 1022 | 50 | 402 |
| 5 | 57 | 11 | 1496 | 1171 | 69 | 489 |
| 10% *Jatropha* SVO, 10% cardanol, 80% diesel | | | | | | |
| 1 | 18 | 0 | 1556 | 300 | 0 | 183 |
| 2 | 27 | 3 | 1545 | 617 | 6.9 | 240 |
| 3 | 38 | 6 | 1533 | 900 | 20 | 287 |
| 4 | 49 | 9 | 1515 | 1112 | 43 | 401 |
| 5 | 59 | 11 | 1496 | 1184 | 65 | 475 |

Above study clearly demonstrates that NOx emissions from blends of natural oil and diesel are higher compared to diesel alone and they are reduced by addition of n-butanol, n-hexanol and cardanol.

Decrease in NOx Due to Addition of n-dodecanol, n-decanol, 9Z, 12Z-octadecadien-1-ol Engine: A Kirloskar twin cylinder with 102 mm bore, 116 mm stroke, 1.9 liters displacement, with compression ratio of 17.5 and 20 hp diesel engine was used.

| mf/min | Load kW | rpm | Nox | Opacity | Egt |
|---|---|---|---|---|---|
| Diesel | | | | | |
| 18 | 0 | 1554 | 292 | 2 | 185 |
| 27 | 3 | 1540 | 602 | 7 | 243 |
| 38 | 6 | 1537 | 904 | 21 | 304 |
| 49 | 9 | 1517 | 1135 | 47 | 408 |
| 59 | 11 | 1499 | 1394 | 69 | 490 |
| 15% *Jatropha* SVO, 85% diesel | | | | | |
| 20 | 0 | 1555 | 391 | 2 | 196 |
| 30 | 3.1 | 1545 | 748 | 13 | 252 |
| 39 | 6 | 1531 | 1045 | 30 | 336 |
| 49 | 9.1 | 1512 | 1269 | 54 | 436 |
| 59 | 11.1 | 1333 | 1480 | 77 | 500 |
| 7.5% *Jatropha* SVO, 7.5% n-decanol, 85% diesel | | | | | |
| 18 | 0 | 1554 | 315 | 1 | 189 |
| 28 | 3.1 | 1540 | 639 | 3 | 256 |
| 38 | 6 | 1532 | 876 | 14 | 332 |
| 48 | 9.1 | 1509 | 1074 | 37 | 434 |
| 58 | 11 | 1496 | 1129 | 69 | 510 |
| 15% *Jatropha* trans esterified biodiesel, 85% diesel | | | | | |
| 19 | 0 | 1553 | 363 | 2 | 196 |
| 29 | 3 | 1535 | 681 | 8 | 268 |
| 38 | 6.1 | 1526 | 898 | 14 | 334 |
| 49 | 9 | 1503 | 1115 | 43 | 430 |
| 59 | 11 | 1492 | 1331 | 69 | 522 |

-continued

| mf/min | Load kW | rpm | Nox | Opacity | Egt |
|---|---|---|---|---|---|
| 7.5% *Jatropha* SVO, 7.5% n-dodecanol, 90% diesel | | | | | |
| 18 | 0 | 1560 | 310 | 1 | 186 |
| 28 | 3.1 | 1556 | 540 | 9 | 232 |
| 38 | 6 | 1533 | 837 | 18 | 298 |
| 48 | 9 | 1511 | 1030 | 35 | 418 |
| 57 | 11 | 1499 | 1110 | 63 | 494 |
| 7.5% *Jatropha* SVO, 7.5% 9Z,12Z-octadecadien-1-ol, 80% diesel | | | | | |
| 18 | 0 | 1554 | 292 | 0 | 185 |
| 27 | 3 | 1540 | 602 | 7 | 243 |
| 38 | 6 | 1537 | 904 | 21 | 304 |
| 48 | 9 | 1517 | 1135 | 47 | 408 |
| 58 | 11 | 1499 | 1194 | 69 | 490 |

Above study clearly demonstrates that NOx emissions from blends of natural oil (SVO) and diesel are higher compared to diesel alone and they are reduced by addition of n-decanol, n-dodecanol and 9Z, 12Z-octadecadien-1-ol.

The invention is further elaborated with the help of following examples. However, these examples should not be construed to limit the scope of invention.

EXAMPLE 1

Miscibility Study of Jatropa Oil (SVO) in Diesel in Presence of n-butanol

Concentrations of samples are

| Sample no | Percentage of diesel | Percentage of *Jatropa* oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

No precipitate: No visible turbidity, precipitate, separation of layers, settling of greasy material, settling of viscous liquid, droplet formation on the walls or any other evidence of non-uniformity in the liquid.

Precipitate: Observation of turbidity, precipitate, separation of layers, settling of greasy material, two different layers, settling of viscous liquid, droplet formation on the walls or observation of non-uniformity in solution.

Thus, it is clear that 5% natural oil (SVO) in diesel is stable for one day and 7.5% or greater than 7.5% blends of SVO in diesel precipitated with in hours. It indicates that, mixing SVO in diesel results in formation of two layers within days. However, there is no precipitation in presence of n-butanol in the blends.

Further, most preferred blends in diesel are containing 1:1 composition of natural oil (SVO) and n-butanol. Concentrations of natural oil and butanol beyond 25% each does not result in a stable composition.

Miscibility study conducted with natural oils from different sources showed the same results as above. These experimental data and the results are as follows:

EXAMPLE 2

Miscibility Study of Coconut Oil (SVO) in Diesel in Presence of n-butanol

Concentrations of samples are

| Sample no | Percentage of diesel | Percentage of coconut oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

The results of the experiment are:

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 3

Miscibility Study of Groundnut Oil (SVO) in Diesel in Presence of n-butanol

Concentrations of samples are:

| Sample no | Percentage of diesel | Percentage of Jatropa oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 4

Miscibility Study of Palm Oil (SVO) in Diesel in Presence of n-Butanol

Concentrations of samples are

| Sample no | Percentage of diesel | Percentage of Palm oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 5

Miscibility Study of Pongamia Oil (SVO) in Diesel in Presence of n-butanol

Concentrations of samples are

| Sample no | Percentage of diesel | Percentage of *Pongamia* oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 6

Miscibility Study of Rapeseed Oil (SVO) in Diesel in Presence of n-butanol

Concentrations of samples are

| Sample no | Percentage of diesel | Percentage of rapeseed oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |

| Sample no | 0 Days | 1 Days | 7 Days | 14 Days | 30 Days | 90 Days | 120 Days |
|---|---|---|---|---|---|---|---|
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 7

Miscibility Study of Soyabean Oil (SVO) in Diesel in Presence of n-butanol

Concentrations of samples are

| Sample no | Percentage of diesel | Percentage of Soyabean oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | precipitate | precipitate | precipitate | precipitate | precipitate |

-continued

| Sample no | 0 Days | 1 Days | 7 Days | 14 Days | 30 Days | 90 Days | 120 Days |
|---|---|---|---|---|---|---|---|
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 8

Miscibility Study of Sunflower Oil (SVO) in Diesel in Presence of n-butanol

Concentrations of samples are

| Sample no | Percentage of diesel | Percentage of Sunflower oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 9

Miscibility Study of Jatropa Oil (SVO) in Diesel in Presence of n-decanol

Concentrations of samples are

| Sample no | Percentage of diesel | Percentage of Sunflower oil | Percentage of n-decanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 10

Miscibility Study of Coconut Oil (SVO) in Diesel in Presence of n-decanol

Concentrations of samples are

| Sample no | Percentage of diesel | Percentage of coconut oil | Percentage of n-decanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 11

Miscibility Study of Pongamia Oil (SVO) in Diesel in Presence of n-decanol

Concentrations of samples are

| Sample no | Percentage of diesel | Percentage of pongamia oil | Percentage of n-decanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |

-continued

| Sample no | 0 Days | 1 Days | 7 Days | 14 Days | 30 Days | 90 Days | 120 Days |
|---|---|---|---|---|---|---|---|
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 12

Miscibility Study of Rapeseed Oil (SVO) in Diesel in Presence of n-decanol

Concentrations of samples are

| Sample no | Percentage of diesel | Percentage of rapeseed oil | Percentage of n-decanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |

| Sample no | 0 Days | 1 Days | 7 Days | 14 Days | 30 Days | 90 Days | 120 Days |
|---|---|---|---|---|---|---|---|
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 13

Miscibility Study of Soyabean Oil (SVO) in Diesel in Presence of n-decanol

Concentrations of samples are

| Sample no | Percentage of diesel | Percentage of soyabean oil | Percentage of n-decanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 14

Miscibility Study of Groundnut Oil (SVO) in Diesel in Presence of n-decanol

Concentrations of samples are

| Sample no | Percentage of diesel | Percentage of groundnut oil | Percentage of n-decanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 15

Miscibility Study of Palm Oil (SVO) in Diesel in Presence of n-decanol

Concentrations of samples are

| Sample no | Percentage of diesel | Percentage of palm oil | Percentage of n-decanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 16

Miscibility Study of Sunflower Oil (SVO) in Diesel in Presence of n-decanol

Concentrations of samples are

| Sample no | Percentage of diesel | Percentage of sunflower oil | Percentage of n-decanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |

| Sample no | 0 Days | 1 Days | 7 Days | 14 Days | 30 Days | 90 Days | 120 Days |
|---|---|---|---|---|---|---|---|
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 17

Miscibility Study of Neem Oil (SVO) in Diesel in Presence of n-decanol

Concentrations of samples are

| Sample no | Percentage of diesel | Percentage of neem oil | Percentage of n-decanol |
|---|---|---|---|
| 1 | 92.5 | | 7.5 |
| 2 | 95 | | 5 |
| 3 | 85 | | 15 |
| 4 | 90 | | 10 |
| 5 | 80 | | 20 |
| 6 | 60 | | 40 |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | 5 | |
| 14 | 90 | 10 | |
| 15 | 80 | 20 | |
| 16 | 60 | 40 | |
| 17 | 85 | 15 | |
| 18 | 92.5 | 7.5 | |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |

-continued

| Sample no | 0 Days | 1 Days | 7 Days | 14 Days | 30 Days | 90 Days | 120 Days |
|---|---|---|---|---|---|---|---|
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 18

Miscibility Study of Jatropa Oil (SVO) in Diesel in Presence of n-dodecanol

Concentrations of samples are

| Sample no | Percentage of diesel | Percentage of Jatropa oil | Percentage of n-dodecanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | precipitate | precipitate | precipitate | precipitate | precipitate | precipitate |
| 15 | No precipitate | No precipitate | No precipitate | No precipitate | No precipitate | No precipitate | No precipitate |
| 16 | No precipitate | precipitate | precipitate | precipitate | precipitate | precipitate | precipitate |
| 17 | No precipitate | No precipitate | No precipitate | No precipitate | No precipitate | No precipitate | No precipitate |
| 18 | No precipitate | precipitate | precipitate | precipitate | precipitate | precipitate | precipitate |

EXAMPLE 19

Miscibility Study of Coconut Oil (SVO) in Diesel in Presence of n-dodecanol

Concentrations of samples are

| Sample no | Percentage of diesel | Percentage of coconut oil | Percentage of n-dodecanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 20

Miscibility Study of Groundnut Oil (SVO) in Diesel in Presence of n-dodecanol

Concentrations of samples are

| Sample no | Percentage of diesel | Percentage of groundnut oil | Percentage of n-dodecanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 21

Miscibility Study of Palm Oil (SVO) in Diesel in Presence of n-dodecanol

Concentrations of samples are

| Sample no | Percentage of diesel | Percentage of palm oil | Percentage of n-dodecanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |

-continued

| Sample no | 0 Days | 1 Days | 7 Days | 14 Days | 30 Days | 90 Days | 120 Days |
|---|---|---|---|---|---|---|---|
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 22

Miscibility Study of Pongamia Oil (SVO) in Diesel in Presence of n-dodecanol

Concentrations of samples are

| Sample no | Percentage of diesel | Percentage of pongamia oil | Percentage of n-dodecanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | precipitate | precipitate | precipitate | precipitate | precipitate |

-continued

| Sample no | 0 Days | 1 Days | 7 Days | 14 Days | 30 Days | 90 Days | 120 Days |
|---|---|---|---|---|---|---|---|
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 23

Miscibility Study of Rapeseed Oil (SVO) in Diesel in Presence of n-dodecanol

Concentrations of samples are

| Sample no | Percentage of diesel | Percentage of rapeseed oil | Percentage of n-dodecanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 24

Miscibility Study of Soyabean Oil (SVO) in Diesel in Presence of n-dodecanol

Concentrations of samples are

| Sample no | Percentage of diesel | Percentage of soyabean oil | Percentage of n-dodecanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 25

Miscibility Study of Sunflower Oil (SVO) in Diesel in Presence of n-dodecanol

Concentrations of samples are

| Sample no | Percentage of diesel | Percentage of sunflower oil | Percentage of n-dodecanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 26

Miscibility Study of Neem Oil (SVO) in Diesel in Presence of n-dodecanol

Concentrations of samples are

| Sample no | Percentage of diesel | Percentage of neem oil | Percentage of n-dodecanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |

-continued

| Sample no | 0 Days | 1 Days | 7 Days | 14 Days | 30 Days | 90 Days | 120 Days |
|---|---|---|---|---|---|---|---|
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 27

Miscibility Study of Palm Oil (SVO) in Diesel in Presence of n-dodecanol

Concentrations of samples are

| Sample no | Percentage of diesel | Percentage of palm oil | Percentage of n-dodecanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |

-continued

| Sample no | 0 Days | 1 Days | 7 Days | 14 Days | 30 Days | 90 Days | 120 Days |
|---|---|---|---|---|---|---|---|
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 28

Miscibility Study of Used (or Waste) Vegetable Oil (WVO) in Diesel in Presence of n-butanol Concentrations of samples are

| Sample no | Percentage of diesel | Percentage of waste vegetable oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 29

Miscibility Study of Used Chicken Fat Oil (Natural Oil) in Diesel in Presence of n-butanol Concentrations of samples are

| Sample no | Percentage of diesel | Percentage of used chicken fat oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 30

Miscibility Study of Animal Fat Oil (Natural Oil) in Diesel in Presence of n-butanol Concentrations of samples are

| Sample no | Percentage of diesel | Percentage of animal fat oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | precipitate |
| 18 | No precipitate | No precipitate | No precipitate | No precipitate | No precipitate | No precipitate | precipitate |

EXAMPLE 31

Miscibility Study of Used Animal Fat Oil (Natural Oil) in Diesel in Presence of n-butanol Concentrations of samples are

| Sample no | Percentage of diesel | Percentage of used animal fat oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |

-continued

| Sample no | 0 Days | 1 Days | 7 Days | 14 Days | 30 Days | 90 Days | 120 Days |
|---|---|---|---|---|---|---|---|
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 32

Miscibility Study of Chicken Fat Oil (Natural Oil) in Diesel in Presence of n-butanol Concentrations of samples are

| Sample no | Percentage of diesel | Percentage of chicken fat oil | Percentage of n-butanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |

-continued

| Sample no | 0 Days | 1 Days | 7 Days | 14 Days | 30 Days | 90 Days | 120 Days |
|---|---|---|---|---|---|---|---|
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 33

Miscibility Study of Chicken Fat Oil (Natural Oil) in Diesel in Presence of n-butanol and n-hexanol Concentrations of samples are

| Sample no | Percentage of diesel | Percentage of chicken fat oil | Percentage of n-butanol | Percentage of n-hexanol |
|---|---|---|---|---|
| 1 | 92.5 | 7.5 | | |
| 2 | 95 | 5 | | |
| 3 | 85 | 15 | | |
| 4 | 90 | 10 | | |
| 5 | 80 | 20 | | |
| 6 | 60 | 40 | | |
| 7 | 90 | 5 | 2.5 | 2.5 |
| 8 | 80 | 10 | 5 | 5 |
| 9 | 85 | 5 | 5 | 5 |
| 10 | 85 | 7.5 | 5 | 2.5 |
| 11 | 60 | 20 | 10 | 10 |
| 12 | 40 | 30 | 15 | 15 |
| 13 | 95 | | 2.5 | 2.5 |
| 14 | 90 | | 5 | 5 |
| 15 | 80 | | 10 | 10 |
| 16 | 60 | | 20 | 20 |
| 17 | 85 | | 7.5 | 7.5 |
| 18 | 92.5 | | 5 | 2.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 34

Miscibility Study of Jatropha Oil (SVO) in Diesel in Presence of n-decanol and n-pentanol Concentrations of samples are

| Sample no | Percentage of diesel | Percentage of Jatropha oil | Percentage of n-pentanol | Percentage of n-decanol |
|---|---|---|---|---|
| 1 | 92.5 | 7.5 | | |
| 2 | 95 | 5 | | |
| 3 | 85 | 15 | | |
| 4 | 90 | 10 | | |
| 5 | 80 | 20 | | |
| 6 | 60 | 40 | | |
| 7 | 90 | 5 | 2.5 | 2.5 |
| 8 | 80 | 10 | 5 | 5 |
| 9 | 85 | 5 | 5 | 5 |
| 10 | 85 | 7.5 | 5 | 2.5 |
| 11 | 60 | 20 | 10 | 10 |
| 12 | 40 | 30 | 15 | 15 |
| 13 | 95 | | 2.5 | 2.5 |
| 14 | 90 | | 5 | 5 |
| 15 | 80 | | 10 | 10 |
| 16 | 60 | | 20 | 20 |
| 17 | 85 | | 7.5 | 7.5 |
| 18 | 92.5 | | 5 | 2.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 35

Miscibility Study of Jatropha Oil (SVO) and Chicken Fat Oil (Natural Oil) in Diesel in Presence of n-butanol Concentrations of samples are

| Sample no | Percentage of diesel | Percentage of jatropha oil | Percentage of chicken fat oil | Percentage of n-butanol |
|---|---|---|---|---|
| 1 | 92.5 | 2.5 | 5 | |
| 2 | 95 | 2.5 | 2.5 | |
| 3 | 85 | 5 | 10 | |
| 4 | 90 | 5 | 5 | |
| 5 | 80 | 10 | 10 | |
| 6 | 60 | 20 | 20 | |
| 7 | 90 | 2.5 | 2.5 | 5 |
| 8 | 80 | 5 | 5 | 10 |
| 9 | 85 | 2.5 | 2.5 | 10 |
| 10 | 85 | 2.5 | 5 | 7.5 |
| 11 | 60 | 10 | 10 | 20 |
| 12 | 40 | 15 | 15 | 30 |
| 13 | 95 | | | 5 |
| 14 | 90 | | | 10 |
| 15 | 80 | | | 20 |
| 16 | 60 | | | 40 |
| 17 | 85 | | | 15 |
| 18 | 92.5 | | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

EXAMPLE 36

Miscibility Study of Coconut Oil (SVO) and Palm Oil (SVO) in Diesel in Presence of n-butanol Concentrations of samples are

| Sample no | Percentage of diesel | Percentage of palm oil | Percentage of coconut oil | Percentage of n-butanol |
|---|---|---|---|---|
| 1 | 92.5 | 2.5 | | 5 |
| 2 | 95 | 2.5 | | 2.5 |
| 3 | 85 | 5 | | 10 |
| 4 | 90 | 5 | | 5 |
| 5 | 80 | 10 | | 10 |
| 6 | 60 | 20 | | 20 |
| 7 | 90 | 2.5 | 2.5 | 5 |
| 8 | 80 | 5 | 5 | 10 |
| 9 | 85 | 2.5 | 2.5 | 10 |
| 10 | 85 | 2.5 | 5 | 7.5 |
| 11 | 60 | 10 | 10 | 20 |
| 12 | 40 | 15 | 15 | 30 |
| 13 | 95 | | | 5 |
| 14 | 90 | | | 10 |
| 15 | 80 | | | 20 |
| 16 | 60 | | | 40 |
| 17 | 85 | | | 15 |
| 18 | 92.5 | | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |

-continued

| Sample no | 0 Days | 1 Days | 7 Days | 14 Days | 30 Days | 90 Days | 120 Days |
|---|---|---|---|---|---|---|---|
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

Similar experiments were carried with cardanol instead of linear chain alcohols such as n-butanol, n-heptanaol, n-decanol etc. Cardanol also showed similar results as compared to butanol and other linear chain alcohols tested above. The experiment and the results obtained by the addition of cardanol to diesel-natural oil mixture is tabulated below:

EXAMPLE 37

Miscibility Study of Jatropha Oil (SVO) in Diesel in Presence of n-cardanol

Concentrations of samples are

| Sample no | Percentage of diesel | Percentage of Jatropha oil | Percentage of n-cardanol |
|---|---|---|---|
| 1 | 92.5 | 7.5 | |
| 2 | 95 | 5 | |
| 3 | 85 | 15 | |
| 4 | 90 | 10 | |
| 5 | 80 | 20 | |
| 6 | 60 | 40 | |
| 7 | 90 | 5 | 5 |
| 8 | 80 | 10 | 10 |
| 9 | 85 | 5 | 10 |
| 10 | 85 | 7.5 | 7.5 |
| 11 | 60 | 20 | 20 |
| 12 | 40 | 30 | 30 |
| 13 | 95 | | 5 |
| 14 | 90 | | 10 |
| 15 | 80 | | 20 |
| 16 | 60 | | 40 |
| 17 | 85 | | 15 |
| 18 | 92.5 | | 7.5 |

Miscibility study results are

| Sample no | 0 Days | 1 Days | 7 Days | 14 Days | 30 Days | 90 Days | 120 Days |
|---|---|---|---|---|---|---|---|
| 1 | No precipitate | precipitate | precipitate | precipitate | precipitate | precipitate | precipitate |
| 2 | No precipitate | No precipitate | precipitate | precipitate | precipitate | precipitate | precipitate |
| 3 | No precipitate | precipitate | precipitate | precipitate | precipitate | precipitate | precipitate |
| 4 | No precipitate | precipitate | precipitate | precipitate | precipitate | precipitate | precipitate |
| 5 | No precipitate | precipitate | precipitate | precipitate | precipitate | precipitate | precipitate |
| 6 | precipitate | precipitate | precipitate | precipitate | precipitate | precipitate | precipitate |
| 7 | No precipitate | No precipitate | No precipitate | No precipitate | No precipitate | No precipitate | No precipitate |
| 8 | No precipitate | No precipitate | No precipitate | No precipitate | No precipitate | No precipitate | No precipitate |
| 9 | No precipitate | No precipitate | No precipitate | No precipitate | No precipitate | No precipitate | No precipitate |
| 10 | No precipitate | No precipitate | No precipitate | No precipitate | No precipitate | No precipitate | No precipitate |
| 11 | No precipitate | No precipitate | No precipitate | No precipitate | No precipitate | No precipitate | No precipitate |
| 12 | Precipitate | precipitate | precipitate | precipitate | precipitate | precipitate | precipitate |

-continued

| Sample no | 0 Days | 1 Days | 7 Days | 14 Days | 30 Days | 90 Days | 120 Days |
|---|---|---|---|---|---|---|---|
| 13 | No precipitate | No precipitate | No precipitate | No precipitate | No precipitate | No precipitate | No precipitate |
| 14 | No precipitate | No precipitate | No precipitate | No precipitate | No precipitate | No precipitate | No precipitate |
| 15 | No precipitate | No precipitate | No precipitate | No precipitate | No precipitate | No precipitate | No precipitate |
| 16 | No precipitate | No precipitate | No precipitate | No precipitate | No precipitate | No precipitate | No precipitate |
| 17 | No precipitate | No precipitate | No precipitate | No precipitate | No precipitate | No precipitate | No precipitate |
| 18 | No precipitate | No precipitate | No precipitate | No precipitate | No precipitate | No precipitate | No precipitate |

We claim:

1. A biofuel composition consisting of normal chain alcohol(s) having greater than 3 carbon atoms but not more than 21 carbon atoms at a concentration ranging from about 1% to about 24% v/v, natural oil(s) at a concentration ranging from about 1% to about 24% v/v and diesel at a concentration ranging from about 52% to about 98% v/v, optionally along with fuel additive(s), wherein the natural oil(s) comprise triglycerides.

2. The biofuel composition as claimed in claim 1, wherein the normal chain alcohols are selected from the group consisting of n-butanol, n-pentanol, n-hexanol, n-heptanol, n-octanol (capryl alcohol), n-nonanol (pelargonic alcohol), n-decanol (capric alcohol) n-dodecanol (lauryl alcohol), n-pentadecanol, n-hexadecanol (cetyl alcohol), n-tetradecanol (myristyl alcohol), cis-9-hexadecen-1-ol (palmitoleyl alcohol), n-octadecanol (stearyl alcohol), 9E-octadecen-1-ol (elaidyl alcohol), cis-9-octadecen-1-ol (oleyl alcohol), 9Z, 12Z-octadecadien-1-ol (linoleyl alcohol), 9E, 12E-octadecadien-1-ol (elaidolinoleyl alcohol), 9Z, 12Z, 15Z-octadecatrien-1-ol (linolenyl alcohol), 9E, 12E, 15E-octadecadien-1-ol (elaidolinolenyl alcohol), 12-hydroxy-9-octadecen-1-ol (ricinoleyl alcohol), 1-eicosanol (arachidyl alcohol) and any combination thereof, wherein the natural oil(s) are selected from the group consisting of straight vegetable oil (SVO), plant parts oils (PPO), tree based oil (TBO), animal fat oil and any combination thereof, and wherein the fuel additive(s) is selected from the group consisting of anti-polymerizing agents, anti-knocking agents, anti-freezing agents, anti-coagulation agents, anti-precipitation agents, cetane index boosters, cetane number boosters and any combination thereof, wherein said fuel additive(s) is present at a concentration ranging from about 0.01 to about 5% v/v.

3. The biofuel composition as claimed in claim 1, wherein the ratio of normal chain alcohol(s) and natural oil(s) is 1:1.

4. The biofuel composition as claimed in claim 1, wherein the biofuel composition comprises normal chain alcohol(s) having greater than 3 carbon atoms but not more than 21 carbon atoms at a concentration of about 5% v/v, natural oil(s) at a concentration of about 5% v/v and diesel at a concentration of about 90% v/v, optionally along with fuel additive(s).

5. The biofuel composition as claimed in claim 1, wherein the biofuel composition comprises normal chain alcohol(s) having greater than 3 carbon atoms but not more than 21 carbon atoms at a concentration of about 7.5% v/v, natural oil(s) at a concentration of about 7.5% v/v and diesel at a concentration of about 85% v/v, optionally along with fuel additive(s).

6. The biofuel composition as claimed in claim 1, wherein the biofuel composition comprises normal chain alcohol(s) having greater than 3 carbon atoms but not more than 21 carbon atoms at a concentration of about 10% v/v, natural oil(s) at a concentration of about 10% v/v and diesel at a concentration of about 80% v/v, optionally along with fuel additive(s).

7. The biofuel composition as claimed in claim 1, wherein the biofuel composition comprises normal chain alcohol(s) having greater than 3 carbon atoms but not more than 21 carbon atoms at a concentration of about 20% v/v, natural oil(s) at a concentration of about 20% v/v and diesel at a concentration of about 60% v/v, optionally along with fuel additive(s).

8. The biofuel composition as claimed in claim 1, wherein the biofuel composition comprises normal chain alcohol(s) having greater than 3 carbon atoms but not more than 21 carbon atoms at a concentration of about 10% v/v, natural oil(s) at a concentration of about 5% v/v and diesel at a concentration of about 85% v/v, optionally along with fuel additive(s).

9. A biofuel composition comprising n-butanol at a concentration ranging from about 1% to about 24% v/v, natural oil(s) at a concentration ranging from about 1% to about 24% v/v and diesel at a concentration ranging from about 52% to about 98% v/v, optionally along with fuel additive(s).

10. A process for preparation of biofuel composition consisting of normal chain alcohol(s) having greater than 3 carbon atoms but not more than 21 carbon atoms at a concentration ranging from about 1% to about 24% v/v, natural oil(s) at a concentration ranging from about 1% to about 24% v/v and diesel at a concentration ranging from about 52% to about 98% v/v, optionally along with fuel additive(s), wherein the natural oil(s) comprise triglycerides, said process comprises mixing said normal chain alcohol(s) with a blend comprising the natural oil(s) and the diesel, optionally along with fuel additive(s).

11. The process as claimed in claim 10, wherein the normal chain alcohols are selected from the group consisting of n-butanol, n-pentanol, n-hexanol, n-heptanol, n-octanol (capryl alcohol), n-nonanol (pelargonic alcohol), n-decanol(capric alcohol), n-dodecanol (lauryl alcohol), n-pentadecanol, n-hexadecanol (cetyl alcohol), n-tetradecanol (myristyl alcohol), cis-9-hexadecen-1-ol (palmitoleyl alcohol), n-octadecanol (stearyl alcohol), 9E-octadecen-1-ol (elaidyl alcohol), cis-9-octadecen-1-ol (oleyl alcohol), 9Z, 12Z-octadecadien-1-ol (linoleyl alcohol), 9E, 12E-octadecen-1-ol (elaidolinoleyl alcohol),9Z, 12Z, 15Z-octadecatrien-1-ol (linoleynl alcohol, 9E, 12E, 15E-octadecadien-1-ol (elaidolinoleyl alcohol), 12-hydroxy-9-octadecen-1-ol (ricinoleyl alcohol), 1-eicosanol (arachidyl alcohol) and any combination thereof, wherein the natural oil(s) are selected from a group comprising straight vegetable oil (SVO), plant parts oils (PPO), tree based oil (TBO), animal fat oil or any combinations thereof, wherein the natural oil(s) are obtained by mechanical or chemical treatment of the source from which it is derived.

12. The process as claimed in claim 10, wherein the ratio of normal chain alcohol(s) and natural oils is 1:1.

13. The process as claimed in claim 10, wherein the fuel additive(s) is selected from the group consisting of anti-polymerizing agents, anti-knocking agents, anti-freezing agents, anti-coagulation agents, anti-precipitation agents, cetane index boosters, cetane number boosters and any combination thereof, wherein the fuel additive(s) is present at a concentration ranging from about 0.01 to about 5% v/v.

14. The process as claimed in claim 10, wherein the process provides for biofuel composition comprising normal chain alcohol(s) having greater than 3 carbon atoms but not more than 21 carbon atoms at a concentration of about 5% v/v, natural oil(s) at a concentration of about 5% v/v and diesel at a concentration of about 90% v/v, optionally along with fuel additive(s).

15. The process as claimed in claim 10, wherein the process provides for biofuel composition comprising normal chain alcohol(s) having greater than 3 carbon atoms but not more than 21 carbon atoms at a concentration of about 7.5% v/v, natural oil(s) at a concentration of about 7.5% v/v and diesel at a concentration of about 85% v/v, optionally along with fuel additive(s).

16. The process as claimed in claim 10, wherein the process provides for biofuel composition comprising normal chain alcohol(s) having greater than 3 carbon atoms but not more than 21 carbon atoms at a concentration of about 10% v/v, natural oil(s) at a concentration of about 10% v/v and diesel at a concentration of about 80% v/v, optionally along with fuel additive(s).

17. The process as claimed in claim 10, wherein the process provides for biofuel composition comprising normal chain alcohol(s) having greater than 3 carbon atoms but not more than 21 carbon atoms at a concentration of about 20% v/v, natural oil(s) at a concentration of about 20% v/v and diesel at a concentration of about 60% v/v, optionally along with fuel additive(s).

18. The process as claimed in claim 10, wherein the process provides for biofuel composition comprising normal chain alcohol(s) having greater than 3 carbon atoms but not more than 21 carbon atoms at a concentration of about 10%v/v, natural oil(s) at a concentration of about 5% v/v and diesel at a concentration of about 85% v/v, optionally along with fueladditive(s).

19. The process as claimed in claim 10, wherein the process provides for biofuel composition comprising butanol at a concentration ranging from about 1% to about 24% v/v, natural oil(s) at a concentration ranging from about 1% to about 24% v/v and diesel at a concentration ranging from about 52% to about 98% v/v, optionally along with fuel additive(s).

20. A method of fueling biofuel composition consisting of normal chain alcohol(s) having greater than 3 carbon atoms but not more than 21 carbon atoms at a concentration ranging from about 1% to about 24% v/v, natural oil(s) at a concentration ranging from about 1% to about 24% v/v and diesel at a concentration ranging from about 52% to about 98% v/v, optionally along with fuel additive(s), wherein the normal oil(s) comprise triglycerides, said method comprising fueling the biofuel composition for fueling applications.

21. The method of fueling as claimed in claim 20, wherein the fueling applications are selected from the group consisting of space heating, lighting, cooking, running of engines in automobiles, running of motor pumps and running of generators.

22. The biofuel composition of claim 2, wherein the fuel additive(s) are present at a concentration ranging from about 0.01% to about 1% v/v.

23. The process as claimed in claim 13, wherein the fuel additives are present at a concentration ranging from about 0.01% to about 1% v/v.

24. the bifuel composition of claim 1, wherein the ratio of natural oils: normal alcohols is in the range of about 1:1 to about 1:2.

25. the proce3ss of claim 10, wherein the ratio of natural oils:normal alcohols is in the range of about 1:1 to about 1:2.

* * * * *